United States Patent
Nada et al.

(10) Patent No.: US 6,654,648 B2
(45) Date of Patent: Nov. 25, 2003

(54) TECHNIQUE OF MONITORING ABNORMALITY IN PLURALITY OF CPUS OR CONTROLLERS

(75) Inventors: Mitsuhiro Nada, Toyota (JP); Shinichi Matsumoto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 305 days.

(21) Appl. No.: 09/809,277

(22) Filed: Mar. 16, 2001

(65) Prior Publication Data

US 2001/0027537 A1 Oct. 4, 2001

(30) Foreign Application Priority Data

Apr. 3, 2000 (JP) .......................... 2000-101379
May 1, 2000 (JP) .......................... 2000-132000

(51) Int. Cl.$^7$ ............................... G05B 11/01
(52) U.S. Cl. ...................... 700/19; 700/2; 700/20; 700/23; 700/39; 700/40; 700/78; 714/11; 714/12; 714/23; 701/22; 701/29; 701/34
(58) Field of Search ................... 700/19, 20–23, 700/2–5, 39, 40, 78–79; 714/11, 12, 23; 290/40 C; 701/22, 29, 34, 70, 89; 180/65.2, 243

(56) References Cited

U.S. PATENT DOCUMENTS

| | | | |
|---|---|---|---|
| 4,313,160 A | * 1/1982 | Kaufman et al. ............. | 710/23 |
| 5,390,103 A | 2/1995 | Sakakibara | |
| 5,487,270 A | * 1/1996 | Yamashita et al. ............ | 60/276 |
| 5,995,916 A | * 11/1999 | Nixon et al. ................. | 702/182 |
| 6,014,612 A | * 1/2000 | Larson et al. ................ | 702/183 |
| 6,047,222 A | * 4/2000 | Burns et al. ................. | 700/79 |
| 6,510,352 B1 | * 1/2003 | Badavas et al. .............. | 700/19 |
| 6,526,323 B1 | * 2/2003 | Miyajima et al. ............. | 700/9 |

FOREIGN PATENT DOCUMENTS

| | | |
|---|---|---|
| EP | 0 103 850 A2 | 3/1984 |
| EP | 0 560 226 A2 | 9/1993 |
| EP | 0 632 379 A2 | 1/1995 |
| JP | 04-307633 | 10/1992 |
| JP | 07143210 | 6/1995 |
| JP | 11-314573 A | 11/1999 |
| JP | 11-33131313 | 11/1999 |

* cited by examiner

Primary Examiner—Ramesh Patel
(74) Attorney, Agent, or Firm—Oliff & Berridge, PLC

(57) ABSTRACT

The technique of the present invention prevents endless circulation of reset operations of CPUs in a control system including a plurality of CPUs that mutually monitor the opposite CPUs. The plurality of CPUs, which are connected with one another and include a first CPU (272) and a second CPU (262), are utilize to control operations of prime movers. The first CPU (272) has a first reset execution unit that carries out a first reset event, which resets a circuit configuration of a predetermined range including the second CPU (262) in response to input of a reset signal. The second CPU (262) has a second reset execution unit that does not output the reset signal to the first CPU (272) in response to the reset of the second CPU (262) by the first reset event but outputs the reset signal to the first CPU (272) in response to detection of abnormality arising in the first CPU (272).

26 Claims, 12 Drawing Sheets

FLOW OF RESET OPERATION WHEN ABNORMALITY ARISES IN MASTER CONTROL CPU

FLOW OF RESET OPERATION WHEN ABNORMALITY ARISES IN MAIN MOTOR CONTROL CPU

Fig. 5A

RESET RECORD AREA IN EEPROM AFTER INITIALIZATION

| EVENT NUMBER | RES1 | RES2 | |
|---|---|---|---|
| #1 | 0 | 0 | } INITIAL RESET TEST RECORD AREA R1 |
| #2 | 0 | 0 | |
| #3 | 0 | 0 | } DURING-DRIVE RESET RECORD AREA R2 |
| #4 | 0 | 0 | |
| ... | ... | ... | |

POINTER PT ▶ (at #1)

Fig. 5B

RESET RECORD AREA IN EEPROM AFTER 1ST RESET TEST

| EVENT NUMBER | RES1 | RES2 | |
|---|---|---|---|
| #1 | 1 | 1 | } INITIAL RESET TEST RECORD AREA R1 |
| #2 | 0 | 0 | |
| #3 | 0 | 0 | } DURING-DRIVE RESET RECORD AREA R2 |
| #4 | 0 | 0 | |
| ... | ... | ... | |

POINTER PT ▶ (at #1)

Fig. 5C

RESET RECORD AREA IN EEPROM AFTER 2ND RESET TEST

| EVENT NUMBER | RES1 | RES2 | |
|---|---|---|---|
| #1 | 1 | 1 | } INITIAL RESET TEST RECORD AREA R1 |
| #2 | 1 | 0 | |
| #3 | 0 | 0 | } DURING-DRIVE RESET RECORD AREA R2 |
| #4 | 0 | 0 | |
| ... | ... | ... | |

POINTER PT ▶ (at #2)

FLOW OF RESET OPERATION WHEN ABNORMALITY ARISES IN MASTER CONTROL CPU

FLOW OF RESET OPERATION WHEN ABNORMALITY ARISES IN MAIN MOTOR CONTROL CPU

FLOW OF RESET OPERATION WHEN ABNORMALITY ARISES IN 1ST MOTOR CONTROL CPU

TECHNIQUE OF MONITORING ABNORMALITY IN PLURALITY OF CPUS OR CONTROLLERS

BACKGROUND OF THE INVENTION

1. Field of the Invention

The present invention generally relates to a series of processing carried out when there is an error, for example, an operation error, in any of a plurality of CPUs or a plurality of controllers included in a hardware configuration. In one concrete application, the present invention pertains to a control technique applied for a moving object with a prime mover or more specifically to a technique of monitoring abnormality in a plurality of CPUs. In another concrete application, the present invention pertains to a technique of detecting an error in a control system including at least two controllers. The technique detects a processing error in any of the at least two controllers included in the control system. The control system has an arithmetic logic unit that functions under the control of a predetermined program, and includes the at least two controllers that respectively carry out specific controls according to the predetermined program.

2. Description of the Related Art

The latest size and cost reductions of computer-aided controllers often cause a large number of controllers to be incorporated in a variety of apparatuses and work as one total control system. For example, a diversity of controllers including an engine controller that controls an engine and a brake controller that regulates the braking force are incorporated in a vehicle, which is one of moving objects with prime movers. The diversity of controllers mutually transmit required information via communication lines and function as a comprehensive control system that totally controls the moving object. This arrangement is not restricted to the vehicles but may be applied in a variety of fields, for example, other moving objects like aircraft and ships, machine tools, plant control apparatuses, and manufacturing equipment.

The arrangement of controlling the whole apparatus or the whole system not with a single computer but with a large number of controllers desirably restricts the required control range of each controller and advantageously simplifies the processing program used in each controller and facilitates verification of the validity of the processing. This arrangement also limits the total number of inputs into and output from each controller and thus enhances the processing speed of connected elements like actuators.

In the control system that utilizes a plurality of controllers for the control, the important issue is how to handle the error arising in each controller. A digital controller generally has a monitoring circuit that monitors the operation of a CPU of interest and resets the CPU of interest in response to detection of abnormality arising in the CPU of interest. The monitoring circuit may be another CPU, which is different from the CPU of interest, or a watchdog circuit.

For example, the technique disclosed in JAPANESE PATENT LAID-OPEN GAZETTE No. 5-143496 utilizes an auxiliary CPU to monitor a main CPU in an air bag unit for the vehicle. The auxiliary CPU monitors the operation of the main CPU, and activates an inhibitor circuit in response to detection of abnormality arising in the main CPU, so as to prohibit signals from being output from the main CPU to an external circuit.

A monitoring circuit adopted in a controller of a power-driven steering wheel is disclosed in JAPANESE PATENT LAID-OPEN GAZETTE No. 11-314573. A watchdog timer or an excess current detection circuit may be applied for the monitoring circuit.

In the case where a plurality of CPUs are used to control a moving object, the applicable construction may allow the CPUs to mutually monitor the operations of the opposite CPUs For example, in one possible configuration, each of two CPUs, which respectively control two prime movers, monitors the operation of the opposite CPU and resets the opposite CPU in response to detection of abnormality arising in the opposite CPU.

In the structure that the plurality of CPUs mutually monitor the opposite CPUs, when one CPU is reset, the CPU successively resets another CPU at the time of reactivation. This is because the reset operation of one CPU generally causes the whole peripheral circuit configuration including the CPU to be reset. This leads to endless circulation of the reset operations of the CPUs and thus prevents the controller from being restored to the normal state.

Some abnormality of the controller is ascribed to abnormality arising in an arithmetic logic operation circuit. If there is any abnormality in an arithmetic logic operation circuit included in a controller, the controller can not detect the occurrence of an error properly.

The distribution of the control to a large number of controllers leads to another technological issue; that is, how to ensure the validity of the processing carried out by another controller. A measure against this issue has been proposed in JAPANESE PATENT LAID-OPEN GAZETTE No. 9-46803. This proposed technique causes the respective controllers to mutually transmit data processed therein, carry out comparison between the transmitted data, and stop the control in the case of inconsistency. Another technique proposed in various ways provides a specific apparatus exclusively used to verify the validity of the processing (for example, a diagnosis computer) and monitor the operation of each controller. As discussed above, there is another widely known technique that provides a watchdog timer to detect abnormality in the sequential series of processing, for example, due to a bug existing in a processing program, in each controller and reset the controller.

Any of these proposed techniques, however, undesirably increases the number of objects, which are subjected to verification for the validity of the processing, in geometric progression with an increase in number of controllers, an increase in number of plants, which are the objects to be controlled by the controllers, or with an increase in quantity of information transmitted therebetween. This leads to the significantly heavy loading relative to the load of the processing to be executed in the respective controllers. One possible measure to prevent such heavy loading is to use the diagnosis computer exclusively used for the verification. Under the condition of the increasing number of signal lines or the increasing quantity of information output from each controller to the diagnosis computer, however, this structure does not ensure the real-time verification. The use of the specific device exclusively used to verify the validity of the processing makes the structure of the whole control system undesirably complicated and raises the required cost.

When the respective controllers carry out significantly complicated operations, another issue arises; that is, how to and what to be verified. One possible measure against this issue allocates the weights to the operations carried out by the respective controllers and carries out strict verification for the operation that generates essential data important for the whole system and for the essential operation important for the control of the whole system. In the moving object like a vehicle, however, any data may be regarded as important and essential. The constructed system is thus required to verify all the operations carried out therein. There has accordingly been no comprehensive measure against the above issues.

SUMMARY OF THE INVENTION

The object of the present invention is thus to provide a comprehensive technique that detects a processing error arising in any of at least two controllers included in a control system, where each of the at least two controllers includes an arithmetic logic operation unit that follows a specific program, and carries out predetermined processing according to the specific program.

At least part of the above and the other related objects is actualized by a technique that utilizes a plurality of controllers, which are connected with one another and include a first controller and a second controller, to control operations of an object. The first controller has a first reset execution unit that carries out a first reset event, which resets a circuit configuration of a predetermined range including the second controller in response to input of a reset signal. The second controller has a second reset execution unit that does not output the reset signal to the first controller in response to the reset of the second controller by the first reset event, and outputs the reset signal to the first controller in response to detection of abnormality arising in the first controller.

In this structure, in response to input of the reset signal, the first controller resets the circuit configuration of the predetermined range including the second controller, while the second controller does not reset the first controller. This arrangement desirably prevents the endless reset operations of the controllers. The second controller resets the first controller only in response to detection of abnormality arising in the first controller. This arrangement thus effectively monitors abnormality in the first controller.

It is preferable that the first controller takes charge of upper-most level control in the circuit configuration of the predetermined range in the process of controlling the object.

This arrangement enables the circuit configuration of the predetermined range including the second controller to be reset in response to the reset operation of the first controller, thus ensuring restoration of the control of the object to the normal state.

In accordance with one preferable application of the present invention, the first controller and the second controller mutually monitor abnormality in the opposite controllers and respectively transmit the reset signal to the opposite controller in response to detection of abnormality arising in the opposite controller.

This arrangement significantly exerts the effect of preventing the endless circulation of the reset operations of the first controller and the second controller.

In accordance with another preferable application of the present invention, the control system further includes a monitoring circuit that monitors abnormality in the first controller and transmits a reset signal to the first controller in response to detection of abnormality arising in the first controller. In the case where the control system is mounted on a moving object with a prime mover, the control system carries out a reset test at a time of starting the moving object. The reset test checks whether or not a reset operation of the first controller by means of the second controller and a reset operation of the first controller by the monitoring circuit are performed normally.

This arrangement enables the reset operation of the first controller to be confirmed, prior to a drive of the moving object, thus improving the reliability of the control system.

In accordance with still another preferable application of the present invention, the control system further includes a reset record registration unit that is connected to one of the plurality of controllers and stores results of the reset test registered therein.

This arrangement enables the controller to readily check the results of the reset test.

The reset record registration unit may have the function of detecting and storing generation of at least part of a plurality of reset signals transmitted to the plurality of controllers in the course of the reset test.

This arrangement enables a check for generation of a preset reset signal during the reset test by examining the reset record registration unit.

In the case where the control system is mounted on a moving object with a prime mover, the reset record registration unit may have a function of detecting and storing generation of at least part of the plurality of reset signals during a drive of the moving object after the reset test.

This arrangement enables the occurrence of abnormality in the controller to be informed during a drive of the moving object by examining the reset record registration unit.

The present invention is also directed to a method of detecting a processing error arising in any of at least two controllers included in a control system, where each of the at least two controllers includes an arithmetic logic operation unit that follows a specific program and carries out predetermined processing according to the specific program. The method includes the steps of: separating a first process from a second process, the first process causing a controller of interest, which executes the predetermined processing, to verify the validity of the predetermined processing based on a result of the predetermined processing, the second process causing another controller, which is different from the controller of interest, to verify the validity of the predetermined processing carried out by the controller of interest; carrying out the first process in which the controller of interest verifies the validity of the predetermined processing; and carrying out the second process in which another controller receives the result of the predetermined processing carried out by the controller of interest and verifies the validity of the predetermined processing.

The technique of the present invention may also be actualized by a control system corresponding to this method of detecting the processing error. In the method of detecting the processing error and the corresponding control system, the first process is separate from the second process. Here the first process causes a controller of interest to verify the validity of the predetermined processing, based on the result of the predetermined processing carried out by the controller of interest. The second process causes another controller, which is different from the controller of interest, to verify the validity of the predetermined processing carried out by the controller of interest. This arrangement effectively prevents the mechanism of detecting the processing error from being undesirably complicated even in the control system of the complex configuration, thus enhancing the speed of detection of the processing error. The division of detection into the first process and the second process clarifies the details of the processing error detected and simplifies the required program.

In the method of detecting the processing error and the corresponding control system, the second process may verify the validity of an operation executed by the arithmetic logic operation unit included in the controller of interest. In this application, in the second process, another controller causes the arithmetic logic operation unit included in another controller to perform an operation and thereby verify the validity of the operation executed in the controller of interest. Here the operation carried out by the arithmetic logic operation unit in the controller of interest may be identical with the operation carried out by the arithmetic logic operation unit in another controller. Alternatively the arithmetic log operation unit in the controller of interest may carry out another operation, based on the results of the operation carried out by the arithmetic logic operation unit in another controller. In the event of malfunction of the internal arithmetic logic operation unit, the controller of interest can not verify the validity of the own operation. For example, a program is postulated that compares the result of the operation with a preset value and changes the details of the processing according to the consistency or inconsistency. The consistency or inconsistency is determined by utilizing the mechanism that a specific value is set to a flag in the case of consistency. When the mechanism of changing the value of the flag malfunctions to always set the flag representing consistency, the arithmetic logic operation unit can not perform the correct operation. In case of such troubles, the arrangement outputs the result of the operation, which is carried out by the arithmetic logic operation unit included in the controller of interest, to another controller and verifies the validity of the operation, based on the result of the operation carried out by the arithmetic logic operation unit included in another controller. This arrangement does not verify the validity of specific data but preferably verifies the validity of the arithmetic logic operation itself.

In accordance with one preferable application of the method of the present invention, the first process specifies a range of a result obtained by the first process and thereby verifies the validity of the predetermined processing. In the first process, the controller of interest, which has executed the processing, performs the verification. In many cases, the possible range of the result of the first process can be specified. In such cases, the validity of the processing is verified, whether or not the result of the first process is within the specified range.

In accordance with another preferable application of the method of the present invention, the second process causes another controller to check results of arithmetic logic operations including a predetermined fundamental operation with regard to a predetermined value and thereby verifies the validity of the predetermined processing. In the second process, the controller of interest can not verify the validity of the internal mechanism that carries out the processing. The arrangement of entrusting another controller with the verification ensures the sufficient reliability of verification.

In accordance with still another preferable application of the method of the present invention, each of the at least two controllers is mounted on a moving object with a prime mover, and the first process is at least part of a control process that controls an apparatus including the engine of the moving object. In the moving object with the prime mover, a large number of controllers may work in a cooperative manner to implement the control. This arrangement enables verification of the validity of the processing, while carry out the control of the moving object having such a configuration.

In the moving object, the at least two controllers may be any of an engine controller that controls the engine, a motor controller that controls a motor, which outputs power required for the moving object in cooperation with the engine, a battery controller that regulates a battery, which supplies electric power to the motor, and a brake controller that regulates a braking force of the moving object. For the efficient total control of the moving object, it is practical to assign the required works to the respective controllers mounted on the moving object according to the functions of the moving object.

Each controller is designed to allow transmission of the results of the second process via serial communication. The serial communication favorably enables exchange of data via a small number of signal lines.

In the control system, each controller may be constructed by a one-chip microcomputer including a controller. The use of the one-chip microcomputer desirably reduces the number of external circuits and simplifies the structure of the whole control system.

The technique of the present invention may be attained by a diversity of applications, which include a control system of a moving object and a corresponding control method, a moving object with such a control system mounted thereon, a computer program that actualizes the functions of either the control system or the control method, a recording medium in which such a computer program is recorded, and a data signal that includes such a computer program and is embodied in a carrier wave.

These and other objects, features, aspects, and advantages of the present invention will become more apparent from the following detailed description of the preferred embodiments with the accompanying drawings.

BRIEF DESCRIPTION OF THE DRAWINGS

FIGS. 5A, 5B and 5C show the contents of reset record areas in an EEPROM of an abnormality record registration circuit in the main ECU;

DESCRIPTION OF THE PREFERRED EMBODIMENTS

Figure 1:
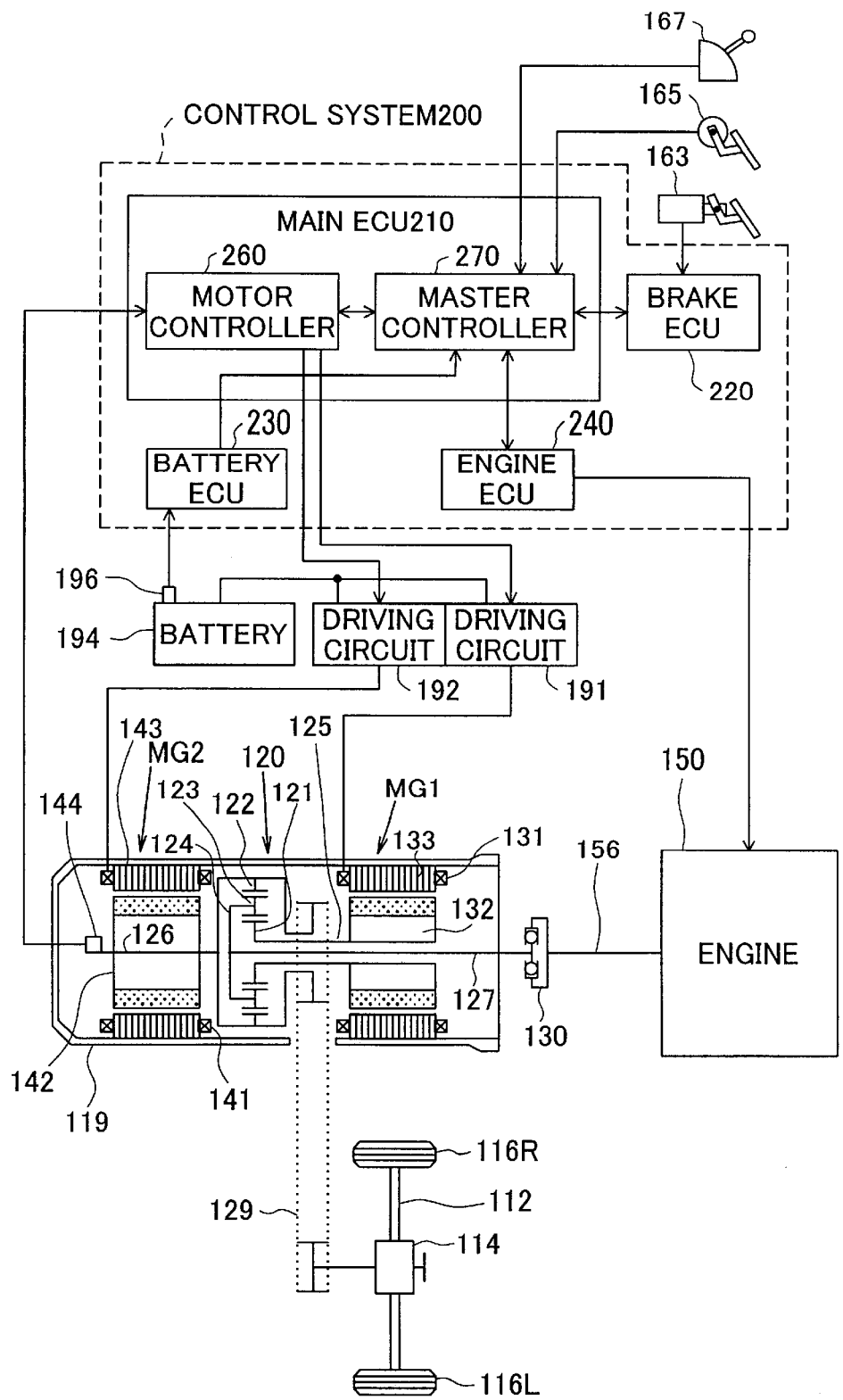
FIG. 1 schematically illustrates the general structure of a hybrid vehicle in one embodiment of the present invention.

Some modes of carrying out the present invention are discussed below as preferred embodiments in the following sequence:
A. General Structure of Hybrid Vehicle
B. Basic Operations of Hybrid Vehicle
C. Structure of Control System in First Embodiment
D. CPU Reset System
E. Reset Test at Starting Time of Vehicle
F. Structure of Main ECU in Second Embodiment
G. Modifications
H. Verification for Validity of Processing in CPUs in Third Embodiment by Hardware Configuration
I. Verification for Validity of Processing in CPUs by Software
J. Verification for Validity of Processing in Opposite CPUs
K. Other Processes of Verification
A. General Structure of Hybrid Vehicle FIG. 1 schematically illustrates the general structure of a hybrid vehicle in one embodiment of the present invention. The hybrid vehicle has three prime movers, that is, one engine 150 and two motor generators MG1 and MG2. Here the motor generator represents the prime mover functioning as both a motor and a generator. In the description hereinafter, for simplicity of explanation, the motor generators are simply referred to as the motors. The hybrid vehicle is under the control of a control system 200.

The control system 200 includes a main ECU 210, a brake ECU 220, a battery ECU 230, and an engine ECU 240. Each of the ECUs is constructed as an integral unit, where a plurality of circuit elements including a microcomputer, an input interface, and an output interface are arranged on one identical circuit board. The main ECU 210 includes a motor controller 260 and a master controller 270. The master controller 270 functions to determine a variety of control-relating amounts, for example, distribution of the output from the three prime movers 150, MG1, and MG2.

The engine 150 is an ordinary gasoline engine and rotates a crankshaft 156. The engine ECU 240 controls operations of the engine 150. The engine ECU 240 regulates the quantity of fuel injection into the engine 150 and other required quantities in response to instructions transmitted from the master controller 270.

The motors MG1 and MG2 are constructed as synchronous motors, and respectively include rotors 132 and 142 with a plurality of permanent magnets mounted on outer circumferences thereof, and stators 133 and 143 with three-phase coils 131 and 141 wounded thereon to form revolving magnetic fields. The stators 133 and 142 are fixed to a casing 119. The three-phase coils 131 and 141 wound on the stators 133 and 143 of the motors MG1 and MG2 are respectively connected to a secondary battery 194 via driving circuits 191 and 192. Each of the driving circuits 191 and 192 is constructed as a transistor inverter including a pair of transistors for each phase as switching elements. The driving circuits 191 and 192 are controlled by the motor controller 260. When the transistors in the driving circuit 191 or in the driving circuit 192 are switched on in response to a control signal transmitted from the motor controller 260, the electric current runs between the battery 194 and the motor MG1 or the motor MG2. Each of the motors MG1 and MG2 may function as the motor that receives a supply of electric power from the battery 194 to be driven and rotated (hereinafter this state of operation is referred to as the power operation). While the rotor 132 or 142 is rotated by an external force, the motor MG1 or MG2 may function as the generator that causes an electromotive force to be generated between both ends of the three-phase coils 131 or 141 and charges the battery 194 (hereinafter this state of operation is referred to as the regenerative operation).

The rotating shafts of the engine 150 and the motors MG1 and MG2 are mechanically linked with one another via a planetary gear 120. The planetary gear 120 includes a sun gear 121, a ring gear 122, and a planetary carrier 124 with a planetary pinion gear 123. In the hybrid vehicle of the embodiment, the crankshaft 156 of the engine 150 is coupled with a planetary carrier shaft 127 via a damper 130. The damper 130 is provided to absorb torsional vibrations arising in the crankshaft 156. The rotor 132 of the motor MG1 is linked with a sun gear shaft 125, whereas the rotor 142 of the motor MG2 is linked with a ring gear shaft 126. The rotation of the ring gear 122 is transmitted to an axle 112 and wheels 116R and 116L via a chain belt 129 and a differential gear 114.

The control system 200 utilizes a diversity of sensors to attain the control of the whole hybrid vehicle. Such sensors include an accelerator sensor 165 that measures the step-on amount of an accelerator pedal by a driver, a gearshift position sensor 167 that detects the position of a gearshift lever, a brake sensor 163 that measures the step-on pressure of a brake pedal, a battery sensor 196 that measures the charge level of the battery 194, and a speed sensor 144 that measures the revolving speed of the motor MG2. The ring gear shaft 126 is mechanically linked with the axle 112 via the chain belt 129, so that the ratio of the revolving speeds of the ring gear shaft 126 to the axle 112 is fixed. The speed sensor 144 disposed on the ring gear shaft 126 accordingly detects the revolving speed of the axle 112 as well as the revolving speed of the motor MG2.

B. Basic Operations of Hybrid Vehicle

The description first regards the operations of the planetary gear 120 to explain the basic operations of the hybrid vehicle. In the planetary gear 120, when the revolving speeds of any two rotating shafts among the three rotating shaft mentioned above are specified, the revolving speed of the residual rotating shaft is automatically determined. The revolving speeds of the respective rotating shafts hold the relationship defined as Equation (1) given below:

$$Nc = Ns \times \rho/(1+\rho) + Nr \times 1/(1+\rho) \quad (1)$$

where Nc, Ns, and Nr respectively denote the revolving speed of the planetary carrier shaft 127, the revolving speed of the sun gear shaft 125, and the revolving speed of the ring gear shaft 126, and ρ represents a gear ratio of the sun gear 121 to the ring gear 122 as expressed by the following equation:

ρ=[number of teeth of sun gear 121] /[number of teeth of ring gear 122]

The torques of the three rotating shafts hold fixed relations defined as Equations (2) and (3) given below, irrespective of their revolving speeds:

$$Ts = Tc \times \rho/(1+\rho) \quad (2)$$

$$Tr = Tc \times 1/(1+\rho) = Ts/\rho \quad (3)$$

where Tc, Ts, and Tr respectively denote the torque of the planetary carrier shaft 127, the torque of the sun gear shaft 125, and the torque of the ring gear shaft 126.

The functions of the planetary gear 120 enable the hybrid vehicle of the embodiment to run in a variety of conditions. For example, in the state of a drive at a relatively low speed immediately after the start of the hybrid vehicle, the motor MG2 carries out the power operation to transmit the power to the axle 112 and drive the hybrid vehicle, while the engine 150 is at a stop or at an idle.

When the speed of the hybrid vehicle reaches a predetermined level, the control system 200 causes the motor MG1 to carry out the power operation and motors and starts the engine 150 with the torque output through the power operation of the motor MG1. At this moment, the reactive torque of the motor MG1 is output to the ring gear 122 via the planetary gear 120.

When the engine 150 is driven to rotate the planetary carrier shaft 127, the sun gear shaft 125 and the ring gear shaft 126 rotate under the conditions fulfilling Equations (1) through (3) given above. The power generated by the rotation of the ring gear shaft 126 is directly transmitted to the wheels 116R and 116L. The power generated by the rotation of the sun gear shaft 125 is, on the other hand, regenerated as electric power by the first motor MG1. The power operation of the second motor MG2 enables the power to be output to the wheels 116R and 116L via the ring gear shaft 126.

In the state of a stationary drive, the output of the engine 150 is set substantially equal to a required power of the axle 112 (that is, the revolving speed×torque of the axle 112). In this state, part of the output of the engine 150 is transmitted directly to the axle 112 via the ring gear shaft 126, while the residual power is regenerated as electric power by the first motor MG1. The second motor MG2 utilizes the regenerated electric power to produce a torque for rotating the ring gear shaft 126. The axle 112 is accordingly driven at a desired revolving speed and a desired torque.

When there is an insufficiency of the torque transmitted to the axle 112, the second motor MG2 supplements the insufficient torque. The electric power obtained by the regenerative operation of the first motor MG1 and the electric power accumulated in the battery 149 are used for such supplement. In this manner, the control system 200 controls the operations of the two motors MG1 and MG2 according to the required power to be output from the axle 112.

The hybrid vehicle of the embodiment may go back in the active state of the engine 150. While the engine 150 is driven, the planetary carrier shaft 127 rotates in the same direction as that in the case of the forward drive. In this state, when the first motor MG1 is controlled to rotate the sun gear shaft 125 at a higher revolving speed than the revolving speed of the planetary carrier shaft 127, the rotating direction of the ring gear shaft 126 is inverted to the direction for the rearward drive as clearly understood from Equation (1) given above. The control system 200 makes the second motor MG2 rotated in the direction for the rearward drive and regulates the output torque, thus enabling the hybrid vehicle to go back.

In the planetary gear 120, the planetary carrier 124 and the sun gear 121 may be rotated while the ring gear 122 is at a stop. The engine 150 is accordingly driven while the vehicle is at a stop. For example, when the battery 194 has a low charge level, the engine 150 is driven and causes the first motor MG1 to carry out the regenerative operation and charge the battery 194. The power operation of the first motor MG1 in the stationary state of the vehicle, on the other hand, motors and starts the engine 150 with the output torque.

C. Structure of Control System in First Embodiment

Figure 2:
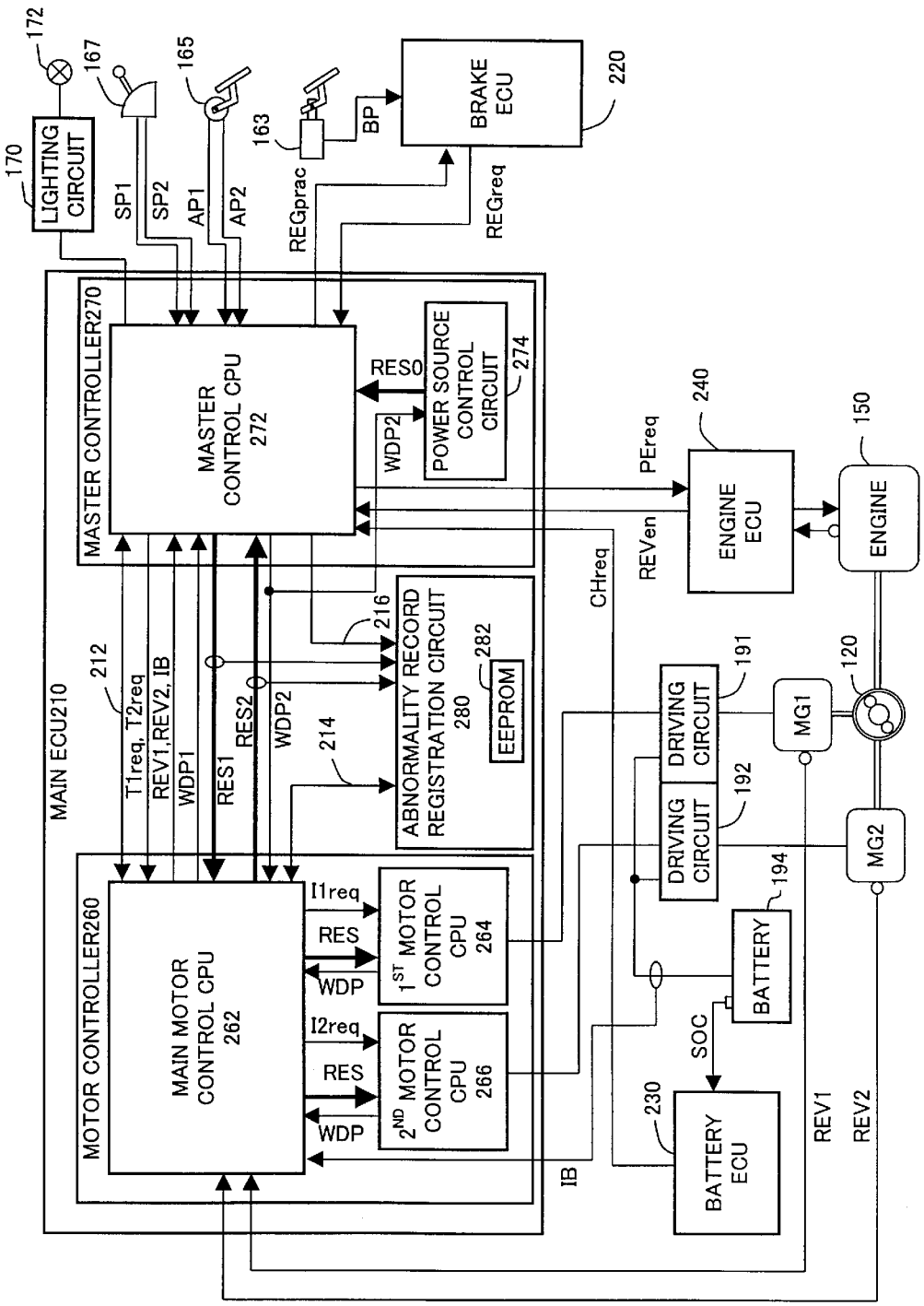
FIG. 2 is a block diagram illustrating the detailed structure of a control system mounted on the hybrid vehicle of the embodiment.

FIG. 2 is a block diagram illustrating the detailed structure of the control system 200 in the first embodiment. The master controller 270 includes a master control CPU 272 and a power source control circuit 274. The motor controller 260 includes a main motor control CPU 262 and two motor control CPUs 264 and 266 that respectively control the two motors MG1 and MG2. Each of the CPUs is constructed as a one-chip microcomputer including a CPU, a ROM, a RAM, an input port, and an output port (not shown).

The master control CPU 272 functions to determine the control-relating amounts, for example, the revolving speeds and the torques of the three prime movers 150, MG1, and MG2 and transmit a diversity of required values to the other CPUs and ECUs, so as to control the operations of the respective prime movers. In order to attain such control, the master control CPU 272 receives accelerator position signals AP1 and AP2 representing the accelerator travel or position and gearshift position signals SP1 and SP2 representing the gearshift position. Both the accelerator sensor 165 and the gearshift position sensor 167 include two sensor elements, which respectively supply the two accelerator position signals AP1 and AP2 and the two gearshift position signals SP1 and SP2 to the master control CPU 272.

A lighting circuit 170 is connected to the master control CPU 272 to light an alarm lamp 172 in response to detection of any abnormality in the master control CPU 272. The alarm lamp 172 is provided, for example, in an instrument panel.

The power source control circuit 274 converts the high-power d.c. voltage of the battery 194 into the low-power d.c. voltage used for the respective circuits included in the main ECU 210. The power source control circuit 274 also has the function of a monitoring circuit that monitors abnormality in the master control CPU 272 as discussed later.

The engine ECU 240 controls the engine 150 according to a required engine output PEreq given by the master control CPU 272. The engine ECU 240 feeds a revolving speed REVen of the engine 150 back to the master control CPU 272.

The main motor control CPU 262 transmits required electric currents I1req and I2req to the two motor control CPUs 264 and 266, based on required torques T1req and T2req of the two motors MG1 and MG2 given by the master control CPU 272. The motor control CPUs 264 and 266 respectively control the driving circuits 191 and 192 according to the required electric currents I1req and I2req, so as to drive the motors MG1 and MG2. The speed sensors of the motors MG1 and MG2 feed revolving speeds REV1 and REV2 of the motors MG1 and MG2 back to the main motor control CPU 262. The master control CPU 272 receives the revolving speeds REV1 and REV2 of the motors MG1 and MG2 as well as a value of electric current IB supplied from the battery 194 to the driving circuits 191 and 19, which are fed back from the main motor control CPU 262.

The battery ECU 230 monitors a state of charge or charge level SOC of the battery 194 and supplies a required value of charging CHreq of the battery 194 to the master control CPU 272 according to the requirements. The master control CPU 272 determines the output of each prime mover by taking into account the required value of charging CHreq. In the case of a requirement for charging, the master control CPU 272 causes the engine 150 to output a greater power than the value required for the drive and distributes part of the output power to the charging operation by means of the first motor MG1.

The brake ECU 220 carries out control to balance a hydraulic brake (not shown) with the regenerative brake by the second motor MG2. This is because the second motor MG2 carries out the regenerative operation to charge the battery 194 in the course of braking the hybrid vehicle of the embodiment. In accordance with a concrete procedure, the brake ECU 220 transmits a required regenerative power REGreq to the master control CPU 272, based on a brake pressure BP measured by the brake sensor 163. The master control CPU 272 specifies the operations of the motors MG1 and MG2 in response to the required regenerative power REGreq and feeds an actual regenerative power REGprac back to the brake ECU 220. The brake ECU 220 regulates the amount of braking by the hydraulic brake to an adequate value, based on the observed brake pressure BP and the difference between the required regenerative power REGreq and the actual regenerative power REGprac.

As described above, the master control CPU 272 determines the outputs of the respective prime movers 150, MG1, and MG2 and transmits the required values to the ECU 240 and the CPUs 264 and 266, which take in charge of the actual controls. The ECU 240 and the CPUs 264 and 266 control the respective prime movers in response to the required values. The hybrid vehicle is accordingly driven with the adequate power output from the axle 112 according to the driving state. In the course of braking, the brake ECU 220 cooperates with the master control CPU 272 to regulate the operations of the respective prime movers and the hydraulic brake. This arrangement attains the desirable braking operation that does not make the driver uneasy or uncomfortable, while allowing regeneration of electric power.

The main ECU 210 has the following construction to monitor abnormality in the respective CPUs. The master control CPU 272 functions to monitor abnormality in the main motor control CPU 262. Monitoring abnormality is performed in the following manner. The main motor control CPU 262 generates a watchdog pulse WDP1, which is a clock signal of a fixed period, and supplies the watchdog pulse WDP1 to the master control CPU 272. The master control CPU 272 has a watchdog timer (not shown). As is well known in the art, the CPU in the normal state outputs the watchdog pulse at the fixed period. In this state, the watchdog timer regards the CPU as normal and does not perform any specific operation. When some abnormality arises in the CPU and the watchdog pulse has not been output for a predetermined time period, the watchdog timer outputs a reset signal to the CPU. This resets the CPU to restart the normal operation. The watchdog timer of the master control CPU 272 monitors the operation of the main motor control CPU 262 based on this principle and supplies a reset signal RES1 to the main motor control CPU 262 in response to detection of abnormality in the main motor control CPU 262.

The main motor control CPU 262 has the function of monitoring abnormality in the master control CPU 272 and the two motor control CPUs 264 and 266. In accordance with a concrete procedure, the main motor control CPU 262 receives watchdog pulses output from these CPUs 272, 264, and 266. In the case where abnormality arises in one of the CPUs, the main motor control CPU 262 supplies a reset signal to the CPU. Namely the master control CPU 272 and the main motor control CPU 262 mutually monitor the operations of the opposite CPUs.

The power source control circuit 274 also monitors the watchdog pulse WDP2 output from the master control CPU 272. Using both the main motor control CPU 262 and the power source control circuit 274 as the monitoring circuits of the master control CPU 272 ensures the effective monitoring of the master control CPU 272. For example, in the case where abnormality arises in both the master control CPU 272 and the main motor control CPU 262, the power source control circuit 274 detects abnormality in the master control CPU 272 and resets the master control CPU 272. The master control CPU 272 takes charge of the control over the whole hybrid vehicle. The multiple configuration of the monitoring circuit significantly enhances the reliability of the control system.

An input port of an abnormality record registration circuit 280 receives the reset signals RES1 and RES2 transmitted between the master control CPU 272 and the main motor control CPU 262. The abnormality record registration circuit 280 registers the input reset signals RES1 and RES2 into an internal EEPROM 282. Namely the abnormality record registration circuit 280 has the function of monitoring the generation of the reset signal and registering the generation record in response to the reset of the master control CPU 272 or the main motor control CPU 262.

The two control CPUs 262 and 272 are connected to the abnormality record registration circuit 280 via bidirectional communication lines 214 and 216 to read and write data. There is another bidirectional communication line 212 between the master control CPU 272 and the main motor control CPU 262 to transmit a variety of data including verification of the validity of the processing (discussed later).

D. CPU Reset System

Figure 3A:
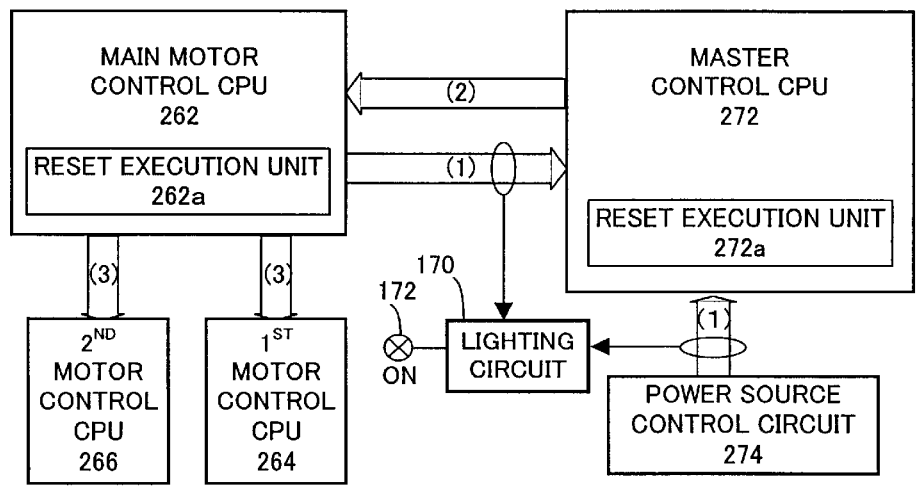
FIGS. 3A and 3B show flows of reset operations carried out when abnormality arises in the respective CPUs included in a main ECU of the control system during a drive of the hybrid vehicle.
Figure 3B:
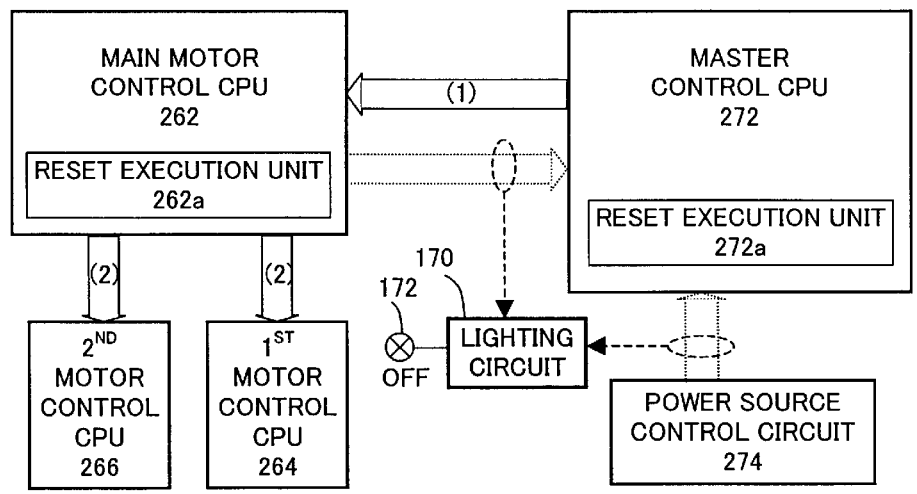

FIGS. 3A and 3B show flows of reset operations carried out when abnormality arises in the respective CPUs included in the main ECU 210 during a drive of the hybrid vehicle. The arrows between the respective CPUs represent the reset signals, and the numerals in the arrows represent the order of generation of the reset signals.

FIG. 3A shows the reset operation when abnormality arises in the master control CPU 272. In the case where both the main motor control CPU 262 and the power source control circuit 274 function normally, the reset signals are input into the master control CPU 272 from both the main motor control CPU 262 and the power source control circuit 274. In response to input of the reset signal from at least one of the main motor control CPU 262 and the power source control circuit 274, the master control CPU 272 is reset and immediately reactivated to subsequently reset the main motor control CPU 262. The main motor control CPU 262 is reset and immediately reactivated to sequentially reset the two motor control CPUs 264 and 266. In this manner, the four CPUs 272, 262, 264, and 266 are all reset to resume the normal operations.

The lighting circuit 170 lights the alarm lamp 172 in response to at least one of the two reset signals input into the master control CPU 272. The lighting circuit 170 is designed to light the alarm lamp 172 only when abnormality arises in the master control CPU 272, which is the upper-most level CPU. The lighting circuit 170 and the alarm lamp 172 may be omitted from the structure, if not required.

The master CPU 272 and the main motor control CPU 262 execute programs, which are stored in advance in ROMs (not shown) in the respective CPUs, to attain the functions of the CPUs as reset execution units 272a and 262a to output the reset signals.

In the flow of FIG. 3A, when abnormality arises in the master control CPU 272, the other CPUs 262, 264, and 266 included in the main ECU 210 are all reset. This is because these CPUs 262, 264, and 266 work based on the requirements and instructions transmitted from the master control CPU 272. In the case where abnormality arises in the master control CPU 272, there is a possibility that the master control CPU 272 transmits wrong requirements and instructions to the other CPUs and that the other CPUs carry out wrong controls in response to the wrong requirements and instructions. The arrangement of resetting all the other CPUs in response to detection of abnormality in the master control CPU 272 enables the other CPUs to resume the normal control operations. From this point of view, one modified arrangement may simultaneously reset the CPUs in the other ECUs that receive the requirements and instructions transmitted from the master control CPU 272 (that is, the CPUs in the brake ECU 220 and the engine ECU 240), in response to detection of abnormality in the master control CPU 272.

FIG. 3B shows the reset operation when abnormality arises in the main motor control CPU 262. In this case, the master control CPU 272 resets the main motor control CPU 262. The main motor control CPU 262 is reset and immediately reactivated to sequentially reset the two motor control CPUs 264 and 266. In this manner, the three CPUs 262, 264, and 266 are all reset to resume the normal operations. The main motor control CPU 262 does not transmit the requirements or instructions to the master control CPU 272. It is accordingly not necessary to reset the master control CPU 272 in response to the reset operation of the main motor control CPU 262. Since no abnormality arises in the master control CPU 272 in this state, the alarm lamp 172 is not lit.

As clearly understood from the above explanation regarding FIGS. 3A and 3B, the master control CPU 272 and the main motor control CPU 262 mutually monitor the abnormality arising in the opposite CPUs. In response to detection of abnormality in the master control CPU 272, the main motor control CPU 262 resets the master control CPU 272, which subsequently resets the main motor control CPU 262. In response to detection of abnormality in the main motor control CPU 262, on the other hand, the master control CPU 272 resets the main motor control CPU 262, which does not reset the master control CPU 272. This arrangement shows the priority sequence of the reset operations of the two CPUs 272 and 262. In response to the reset operation of the CPU 272 having the upper position of priority, the CPU 262 having the lower position of priority is reset. In response to the reset operation of the CPU 262 having the lower position of priority, however, the CPU 272 having the upper position of priority is not reset. Allocating the positions of priority to the reset operations of the CPUs ensures the advantages discussed below.

It is here assumed that the reset execution unit 262a of the main motor control CPU 262 is constructed to reset the master control CPU 272 in response to the reset operation of the main motor control CPU 262. In this arrangement, the first reset operation of the main motor control CPU 262 triggers the endless circulation of the reset operations; that is, the main motor control CPU 262 resets the master control CPU 272, which then resets the main motor control CPU 262. This arrangement prevents the control system from being restored to the normal state. The reset system of FIGS. 3A and 3B, on the other hand, effectively prevents such endless circulation of the reset operations and enables the control system to be restored to the normal state.

As described above, the master control CPU 272 and the main motor control CPU 262 respectively take charge of different parts of the control of the prime movers and mutually monitor abnormality arising in the opposite CPUs. From these two points of view, the master control CPU 272 and the main motor control CPU 262 are on substantially equal terms with each other. Allocating the positions of priority to the reset operations of the two CPUs 272 and 262, which are on substantially equal terms with each other, enables the mutual abnormality monitoring while preventing the endless circulation of the reset operations.

It is desirable that the priority sequence of the reset operations is coincident with the priority sequence of the two CPUs 272 and 262 on the control of the prime movers. In the structure of the embodiment, whereas the master control CPU 272 transmits the required values on the control of the prime movers (that is, the required torques Treq) to the main motor control CPU 262, the main motor control CPU 262 does not transmit the required values on the control of the prime movers to the master control CPU 272. This means that the master control CPU 272 is prior to the main motor control CPU 262 and has the first position of priority over all the other CPUs in the priority sequence on the control of the prime movers. The arrangement of allocating the upper position of priority to the reset operation of the CPU having the upper position of priority in the priority sequence on the control of the prime movers ensures the restoration of the effective control in the control system after the reset operation.

E. Reset Test at Starting Time of Vehicle

Figure 4:
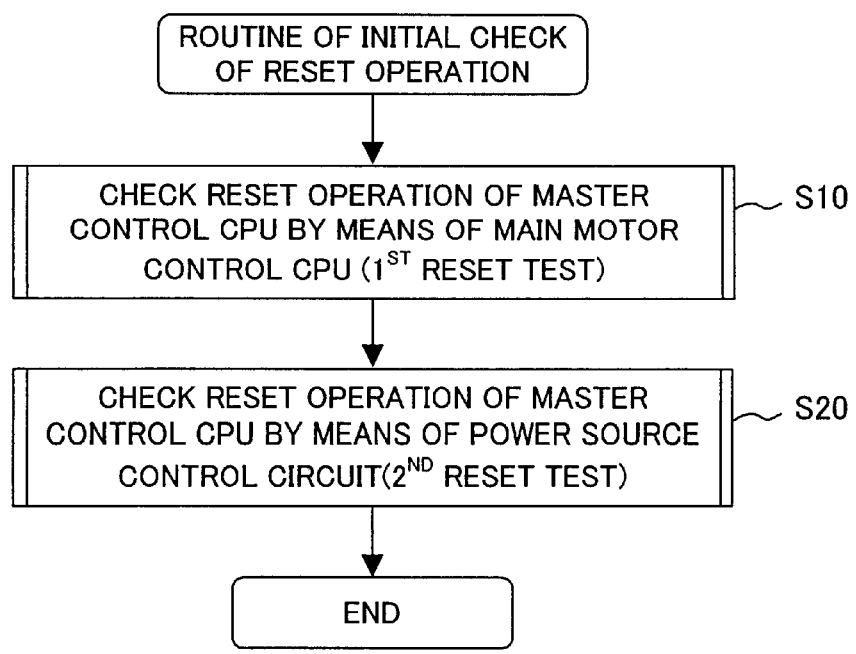
FIG. 4 is a flowchart showing a reset test routine of a master control CPU in the main ECU at the time of starting the hybrid vehicle.

FIG. 4 is a flowchart showing a reset test routine of the master control CPU 272 at the time of starting the hybrid vehicle. When the driver turns the key to ON position, the control system 200 (see FIG. 1) is activated. The reset operations of the master control CPU 272 are checked according to the following procedure. The procedure first checks the reset operation of the master control CPU 272 by means of the main motor control CPU 262 at step S10 (the first reset test) and subsequently checks the reset operation of the master control CPU 272 by means of the power source control circuit 274 at step S20 (the second reset test). The details of the first and the second reset tests will be discussed later. The results of the reset tests are registered in the EEPROM 282 of the abnormality record registration circuit 280.

FIGS. 5A, 5B and 5C show the contents of reset record areas in the EEPROM 282. The reset record areas are set in advance at predetermined positions in the EEPROM 282. There are two reset record areas; that is, an initial reset test record area R1 and a during-drive reset record area R2. Two reset events with event numbers #1 and #2 corresponding to the first and the second reset tests are registered in the initial reset test record area R1. A plurality of reset events with event numbers of and after #3 may be registered in the during-drive reset record area R2. Each reset event is specified by the values representing the on-off state of the reset signals RES1 and RES2. A pointer PT pointing out the latest reset event is also registered in the EEPROM 282. As shown in FIG. 5A, the contents of the registration in the reset record area are initialized at the time of starting the vehicle.

Figure 6:
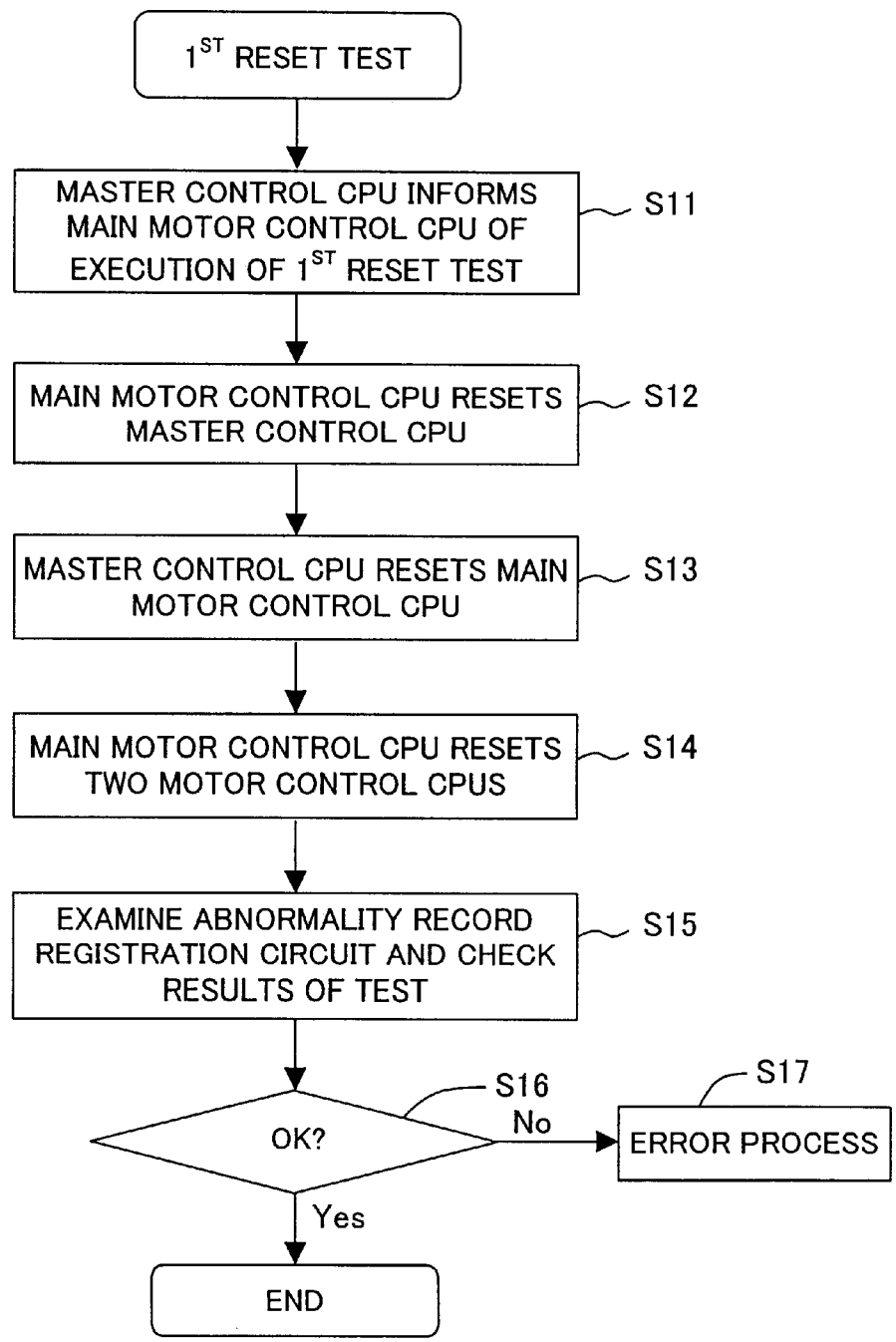
FIG. 6 is a flowchart showing the details of the first reset test, which is carried out at step S10 in the flowchart of FIG. 4.

FIG. 6 is a flowchart showing the details of the first reset test, which is carried out at step S10 in the flowchart of FIG. 4. When the program enters the first reset test of FIG. 6, the master control CPU 272 informs the main motor control CPU 262 of the execution of the first reset test via the bidirectional communication line 212 at step S11. The main motor control CPU 262 receives the information and transmits the reset signal RES2 to the master control CPU 272, so as to reset the master control CPU 272 at step S12. At this moment, the reset signal RES2 is also transmitted to the input port of the abnormality record registration circuit 280 (see FIG. 2), and the value '1' representing the ON state of the reset signal RES2 is registered in the EEPROM 282 (see FIG. 5B).

The master control CPU 272, which has just been reset, is reactivated immediately and transmits the reset signal RES1 to the main motor control CPU 262, so as to reset the main motor control CPU 262 at step S13. At this moment, the value '1' representing the ON state of the reset signal RES1 is registered in the EEPROM 282 (see FIG. 5B). The main motor control CPU 262, which has just been reset, is reactivated immediately and resets the two motor control CPUs 264 and 266 at step S14. The main motor control CPU 262 then reads the results of the reset test registered in the EEPROM 282 and informs the master control CPU 272 of the results of the reset test at step S15.

FIG. 5B shows the reset record after the first reset test. Immediately after the completion of the first reset test, the pointer PT points out the results of the first reset test (that is, the event number #1). When both the reset signals RES1 and RES2 are output in the first reset test, the value '1' is registered at the corresponding positions of the respective signals. When either of the reset signals RES1 and RES2 is not output, the value '0' is registered at the corresponding position of the signal.

The main motor control CPU 262 informs the master control CPU 272 of the fact that the latest reset event is the first reset test (the event number #1) and the results of the first reset test. In the case where both the two reset signals RES1 and RES2 are output in the first reset test, the master control CPU 272 determines that the first reset test has been completed normally and exits from the first reset test at step S16. In the case where at least one of the two reset signals RES1 and RES2 is not output in the first reset test, on the other hand, the master control CPU 272 determines that the first reset test has not been completed normally and carries out an error process at step S17. One exemplified procedure of the error process gives an abnormality display on the instrument panel to inform the driver of abnormality of the control system, and prohibits the further drive of the hybrid vehicle. The master control CPU 272 also carries out the error process in the event that the first reset test has not been completed yet when a preset time period has elapsed since the activation of the control system 200. The first reset test checks that the first reset pathway, in which the main motor control CPU 262 resets the master control CPU 272, works normally.

Figure 7:
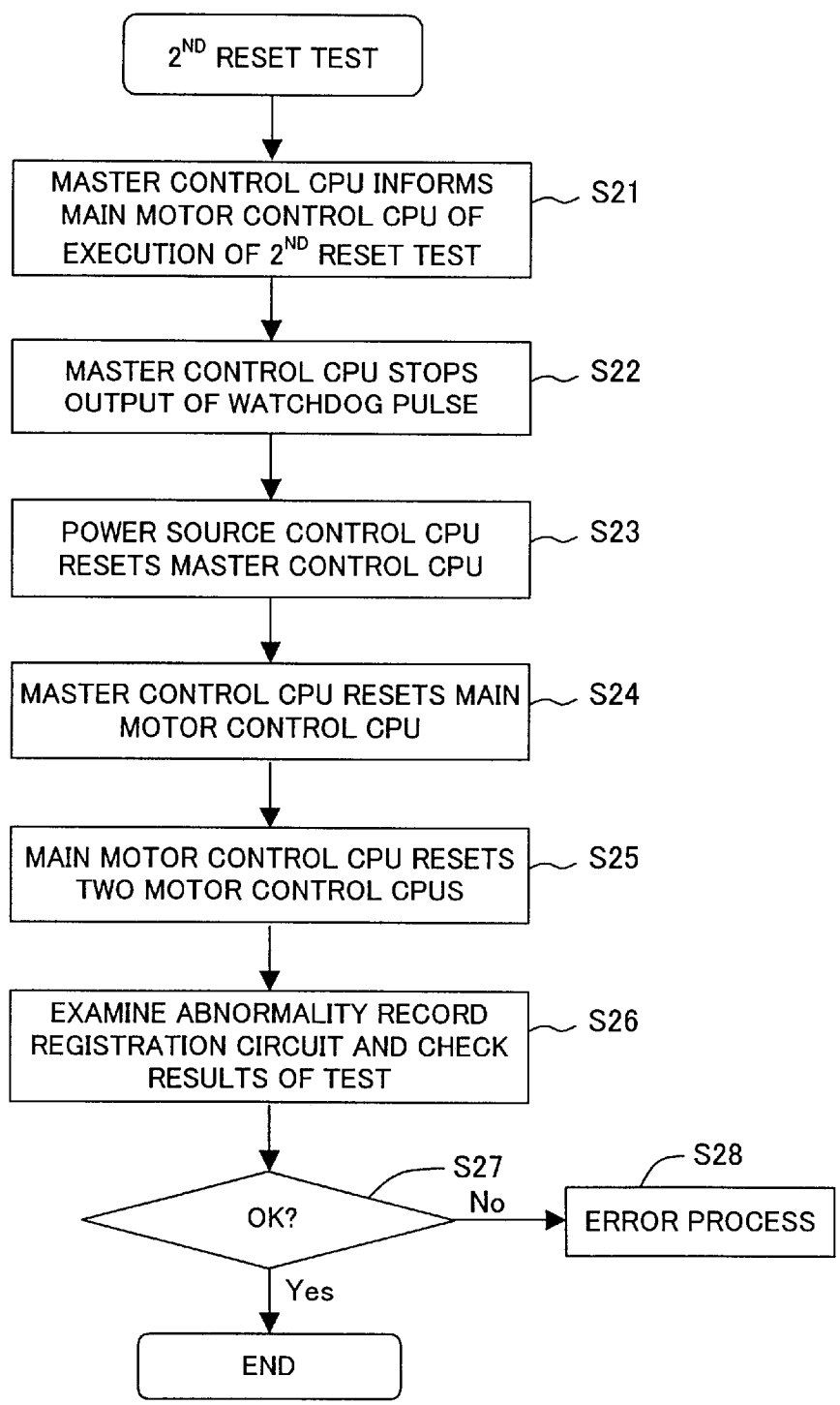
FIG. 7 is a flowchart showing the details of the second reset test, which is carried out at step S20 in the flowchart of FIG. 4.

FIG. 7 is a flowchart showing the details of the second reset test, which is carried out at step S20 in the flowchart of FIG. 4. When the program enters the second reset test of FIG. 7, the master control CPU 272 informs the main motor control CPU 262 of the execution of the second reset test at step S21. The main motor control CPU 262 receives the information and registers the start of the second reset test in the EEPROM 282 of the abnormality record registration circuit 280. This increments the pointer PT in the EEPROM 282 by one and causes the pointer PT to point out the second reset test (the event number #2) as shown in FIG. 5C. The main motor control CPU 262 also prohibits the operation of the watchdog timer that monitors the master control CPU 272.

At subsequent step S22, the master control CPU 272 stops generation of the watchdog pulse WDP2. Since the watchdog timer in the main motor control CPU 262 has been prohibited from counting, only the power source control circuit 274 transmits the reset signal RES0 to the master control CPU 272, so as to reset the master control CPU 272 at step S23.

The master control CPU 272, which has just been reset, is reactivated immediately and transmits the reset signal RES1 to the main motor control CPU 262, so as to reset the main motor control CPU 262 at step S24. At this moment, the value '1' representing the ON state of the reset signal RES1 is registered in the EEPROM 282. The main motor control CPU 262, which has just been reset, is reactivated immediately and resets the two motor control CPUs 264 and 266 at step S25. The main motor control CPU 262 then reads the results of the reset test registered in the EEPROM 282 and informs the master control CPU 272 of the results of the reset test at step S26.

FIG. 5C shows the reset record after the second reset test. Immediately after the completion of the second reset test, the pointer PT points out the results of the second reset test (that is, the event number #2). In the second reset test, while the reset signal RES2 is not transmitted from the main motor control CPU 262 to the master control CPU 272, the reset signal RES1 in the reverse direction is generated.

The main motor control CPU 262 informs the master control CPU 272 of the fact that the latest reset event is the second reset test (the event number #2) and the results of the second reset test. In the case where only the reset signal RES1 is output and the other reset signal RES2 is not generated in the second reset test, the master control CPU 272 determines that the second reset test has been completed normally and exits from the second reset test at step S27. In the case where the reset signal RES1 is not output in the second reset test, on the other hand, the master control CPU 272 determines that the second reset test has not been completed normally and carries out an error process at step S28. The error process of step S28 is identical with the error process executed at step S17 in the flowchart of FIG. 6. The master control CPU 272 also carries out the error process in the event that the second reset test has not been completed yet when a preset time period has elapsed since the activation of the control system 200. The second reset test checks that the second reset pathway, in which the power source control circuit 274 resets the master control CPU 272, works normally.

After the first and the second reset tests confirm that the two reset operations of the master control CPU 272 are performed normally, the master control CPU 272 lights a drive lamp on the instrument panel. This enables the driver to drive the hybrid vehicle.

In the case where either the reset signal RES1 or the reset signal RES2 is output during a drive, the generation record is registered in the during-drive reset record area R2 (see FIG. 5) in the EEPROM 282. After the drive, a service computer is connected to the control system 200 to read the reset record from the EEPROM 282 and check the reset record. This gives the driver the information showing which reset signal is generated during the drive.

One preferable structure enables the generation of the other reset signals to be registered in the reset record areas R1 and R2. The arrangement of allowing the generation record of all the reset signals used to reset the CPUs to be registered in the reset record areas gives the driver the more detailed reset record. Another preferable structure enables the time of occurrence of each reset event to be registered in the reset record areas R1 and R2. In still another preferable structure, the during-drive reset record area R2 is not initialized at every starting time of the vehicle but has the capacity to store the reset record of past several drives.

As described above, the arrangement of the first embodiment checks whether or not the two reset pathways of the master control CPU 272 (that is, the reset signals RES0 and RES2) work normally at the time of starting the vehicle. Even when abnormality arises in the master control CPU 272 during the drive of the vehicle, this arrangement ensures the effective recovery from the abnormality. This arrangement registers the reset record in the abnormality record registration circuit 280 and thus enables the driver to check the during-drive reset record after the drive.

F. Structure of Main ECU in Second Embodiment

Figure 8:
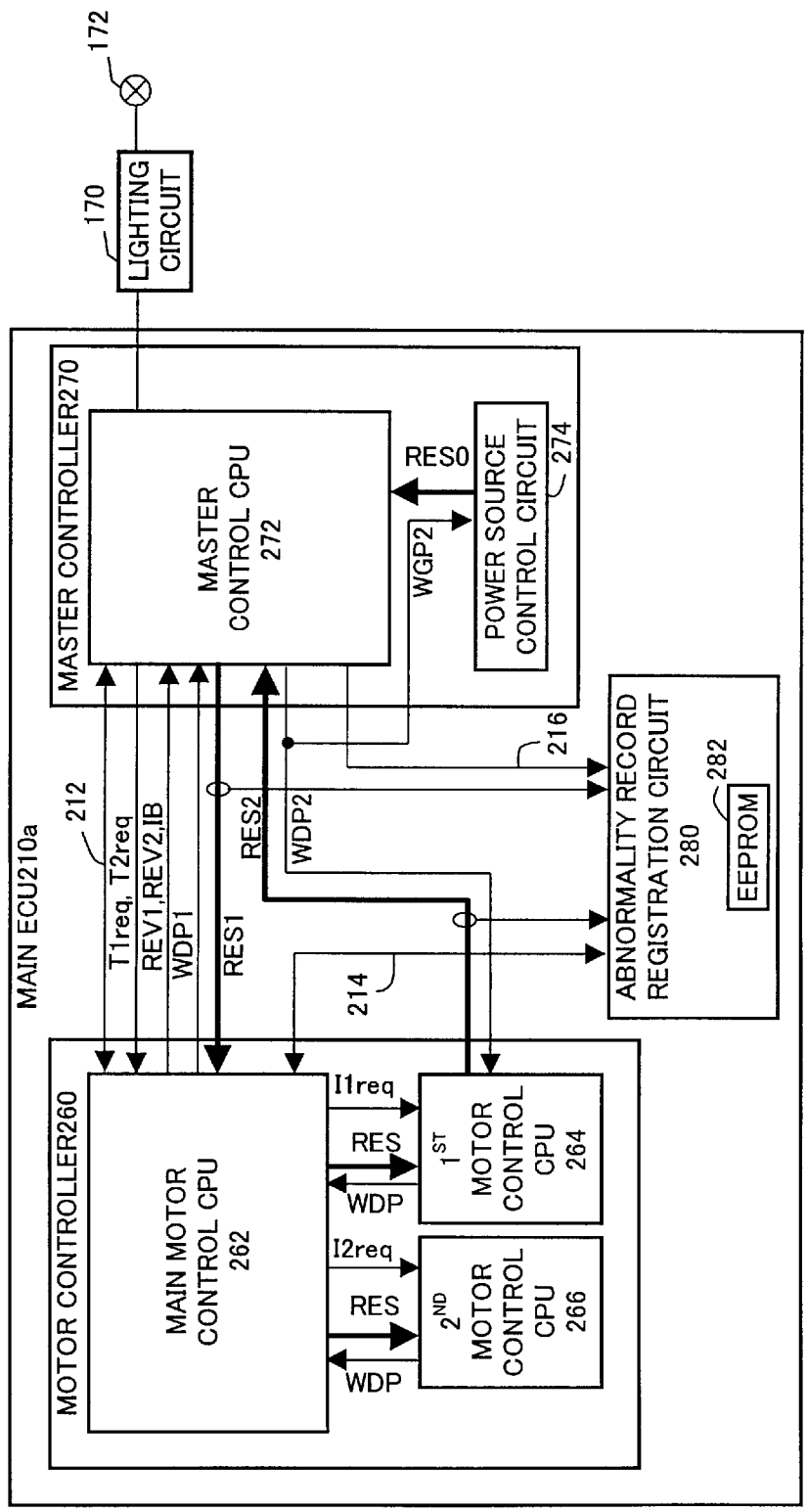
FIG. 8 is a block diagram illustrating the structure of a main ECU in a second embodiment of the present invention.

FIG. 8 is a block diagram illustrating the structure of a main ECU 201a in a second embodiment of the present invention. The main ECU 210a has the similar structure to that of the main ECU 210 of the first embodiment shown in FIG. 2, except that the first motor control CPU 264, in place of the main motor control CPU 262, monitors the master control CPU 272.

The first motor control CPU 264 receives the watchdog pulse WDP2 output from the master control CPU 272. When abnormality arises in the master control CPU 272 to stop the output of the watchdog pulse WDP2, the first motor control CPU 264 transmits the reset signal RES2 to the master control CPU 272, so as to reset the master control CPU 272.

In the structure of the second embodiment, the first motor control CPU 264 monitors abnormality in the master control CPU 272, whereas the main motor control CPU 262 monitors abnormality in the first motor control CPU 264 and the master control CPU 272 monitors abnormality in the main motor control CPU 262. In other words, these three CPUs 272, 262, and 264 monitor the abnormality in a circulating manner.

Figure 9A:
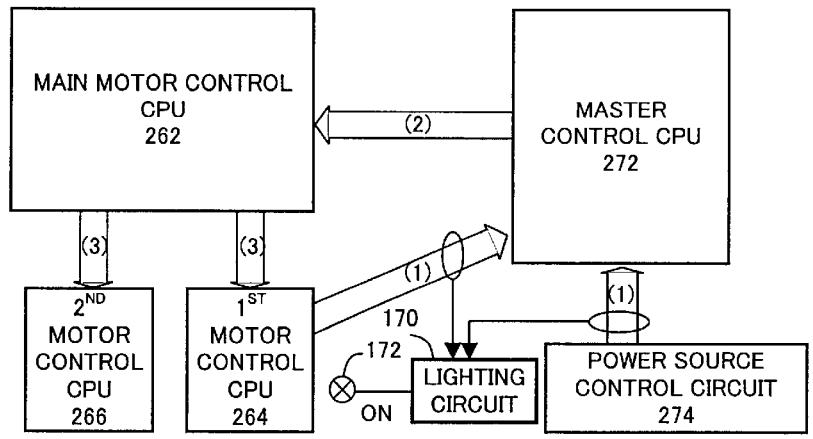
FIGS. 9A, 9B and 9C show flows of reset operations carried out in the second embodiment.

FIG. 9A shows the reset operation when abnormality arises in the master control CPU 272 in the structure of the second embodiment. In response to input of the reset signal from at least one of the first motor control CPU 264 and the power source control circuit 274, the master control CPU 272 is reset and immediately reactivated to subsequently reset the main motor control CPU 262. The main motor control CPU 262 is reset and immediately reactivated to sequentially reset the two motor control CPUs 264 and 266. In this manner, the four CPUs 272, 262, 264, and 266 are all reset to resume the normal operations. The first motor control CPU 264 has a reset execution unit that is designed not to reset the master control CPU 272 again after the reset and the subsequent reactivation. The lighting circuit 170 lights the alarm lamp 172 in response to the reset signal input into the master control CPU 272.

Figure 9B:
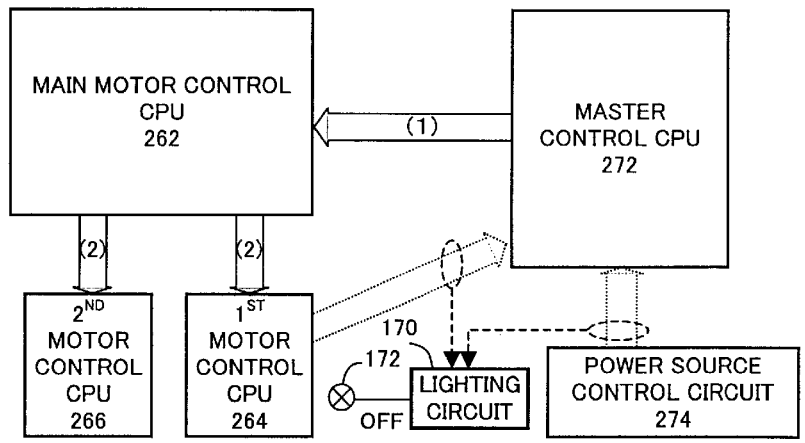

FIG. 9B shows the reset operation when abnormality arises in the main motor control CPU 262 in the structure of the second embodiment. In this case, the master control CPU 272 outputs the reset signal to the main motor control CPU 262. The main motor control CPU 262 is reset and immediately reactivated to sequentially reset the two motor control CPUs 264 and 266. In this manner, the three CPUs 262, 264, and 266 are all reset to resume the normal operations. In this state, the first motor control CPU 264, which has just been reset and reactivated, does not reset the master control CPU 272. Since no abnormality arises in the master control CPU 272 in this state, the lighting circuit 170 does not light the alarm lamp 172.

Figure 9C:
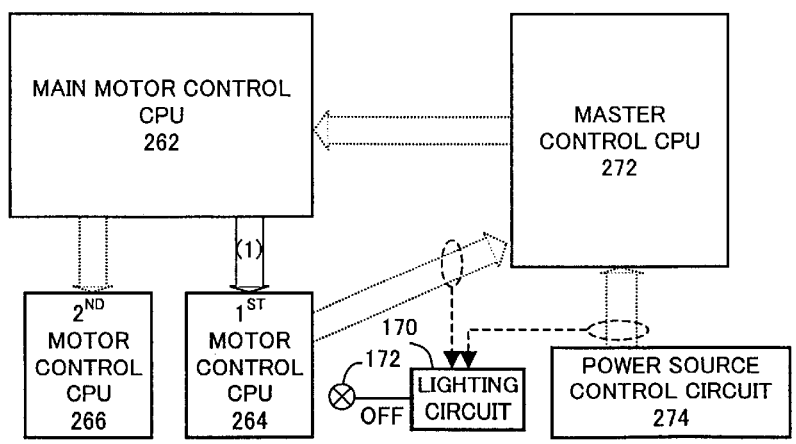

FIG. 9C shows the reset operation when abnormality arises in the first motor control CPU 264 in the structure of the second embodiment. In this case, the main motor control CPU 262 outputs the reset signal to the first motor control CPU 264, so as to reset only the first motor control CPU 264. In this state, the first motor control CPU 264, which has just been reset and reactivated, does not reset the master control CPU 272. Since no abnormality arises in the master control CPU 272 in this state, the lighting circuit 170 does not light the alarm lamp 172.

As clearly understood from the above explanation regarding FIGS. 9A through 9C, the master control CPU 272, the main motor control CPU 262, and the first motor control CPU 264 monitor the abnormality in a circulating manner. The function of the reset execution unit of the first motor control CPU 264 is set in advance not to reset the master control CPU 272 when the first motor control CPU 264, which monitors abnormality in the master control CPU 272, is reset and reactivated. This arrangement effectively prevents the endless circulation of the reset operations and enables the control system to be restored to the normal state.

As clearly understood from the above discussion, in the technique of the present invention actualized as the first and the second embodiments, the reset execution unit of the first CPU (272) is constructed to carry out the first reset event in response to input of the reset signal. In the first reset event, the first CPU (272) resets the circuit configuration (262, 264, 266) in the predetermined range including the second CPU (262 or 264). The reset execution unit of the second CPU (262 or 264) is constructed, on the other hand, not to transmit the reset signal to the first CPU (272) in response to the reset of the second CPU(262 or 264) but to transmit the reset signal to the first CPU (272) in response to detection of abnormality arising in the first CPU (272). This arrangement effectively prevents the endless circulation of the reset operations and enables the control system to be restored to the normal state.

It is desirable to allocate the first CPU to the CPU 272 that takes charge of the upper-most level control in the circuit configuration, which is reset by the first reset event, in the process of controlling the prime movers. Such allocation advantageously enables the operations of the whole control system to be securely restored to the normal state when abnormality arises in the first CPU 272.

G. Modifications

The technique of the present invention is not restricted to the above embodiments or their applications, but there may be many modifications, changes, and alterations without departing from the scope or spirit of the main characteristics of the present invention. Examples of some possible modification are given below.

G1. Modification 1

The first and the second embodiments discussed above regard the hybrid vehicle of the mechanical distribution system that utilizes the planetary gear and distributes the output power of the engine to the axle and the first motor MG1. The technique of the present invention is also applicable to the hybrid vehicle of the electrical distribution system that utilizes motor generators, in place of the planetary gear, and electrically distributes the output power of the engine. The hybrid vehicle of the electrical distribution system is disclosed in, for example, JAPANESE PATENT LAID-OPEN GAZETTE No. 9-46965 filed by the applicant of the present invention, and is thus not specifically described here.

The technique of the present invention is applicable to a diversity of moving objects including various vehicles other than the hybrid vehicle, aircraft, and ships. In general, the present invention is applicable to the moving object using at least one prime mover.

G2. Modification 2

In the structures of the above embodiments, the watchdog pulse WDP is used to monitor abnormality in each CPU. Another possible procedure verifies the validity of the operations executed in each CPU, so as to monitor abnormality in the CPU. For example, the master control CPU 272 and the main motor control CPU 262 may mutually check the results of the operations carried out in the respective CPUs, instead of or in addition to the monitor with the watchdog pulse WDP.

G3. Modification 3

Any arbitrary memory other than the EEPROM 282 may be used as the internal memory of the abnormality record registration circuit 280 (see FIG. 2). A non-volatile memory like the EEPROM is, however, preferable since the contents of the registration are kept even when the power supply is cut off. In one preferable application, in order to prevent the power supply to the abnormality record registration circuit 280 from being cut off in response to the reset operations of the CPUs in the ECU 210, the required power is supplied from a separate power source circuit, which is substantially independent of the CPUs in the ECU 210, to the abnormality record registration circuit 280.

H. Verification for Validity of Processing in CPUs in Third Embodiment by Hardware Configuration The following describes a third embodiment of the present invention. The arrangement of the third embodiment is based on the hardware configuration of the first embodiment discussed above. In the structure of the third embodiment, the main ECU 210 has the following construction to monitor abnormality in the respective CPUs. The master control CPU 272 functions to monitor abnormality in the main motor control CPU 262. Monitoring abnormality is performed in the following manner. The main motor control CPU 262 generates the watchdog pulse WDP1, which is a clock signal of a fixed period, and supplies the watchdog pulse WDP1 to the master control CPU 272. The master control CPU 272 has the watchdog timer (not shown). As is well known in the art, the CPU in the normal state outputs the watchdog pulse at the fixed period. In this state, the watchdog timer regards the CPU as normal and does not perform any specific operation. When some abnormality arises in the CPU and the watchdog pulse has not been output for a predetermined time period, the watchdog timer outputs the reset signal to the CPU. This resets the CPU to restart the normal operation. The watchdog timer of the master control CPU 272 monitors the operation of the main motor control CPU 262 based on this principle and supplies the reset signal RES1 to the main motor control CPU 262 in response to detection of abnormality in the main motor control CPU 262.

The main motor control CPU 262 has the function of monitoring abnormality in the master control CPU 272 and the two motor control CPUs 264 and 266. In accordance with a concrete procedure, the main motor control CPU 262 receives the watchdog pulses output from these CPUs 272, 264, and 266. In the case where some abnormality arises in one of the CPUs to prevent the output of the watchdog pulse, the main motor control CPU 262 supplies the reset signal to the CPU after a predetermined time period. Namely the master control CPU 272 and the main motor control CPU 262 mutually monitor the operations of the opposite CPUs. The watchdog pulses WDP transmitted from the respective CPUs may be input into watchdog timer circuits of the opposite CPUs, which are provided as hardware elements. In another possible application, each of the output watchdog pulses is input into an interrupt control circuit of the opposite CPU, and the CPU accepting the interrupt carries out an interrupt process to actualize the functions of the watchdog timer. In the latter case, a program is stored in the CPU functioning as the monitoring circuit to be activated by an internal timer interrupt after a predetermined time period and output the reset signal RES. The timer interrupt is reset by the non-maskable interrupt control signal. This arrangement corresponds to the watchdog timer by the software.

The power source control circuit 274 also monitors the watchdog pulse WDP2 output from the master control CPU 272. Using both the main motor control CPU 262 and the power source control circuit 274 as the monitoring circuits of the master control CPU 272 ensures the effective monitoring of the master control CPU 272. For example, in the case where abnormality arises in both the master control CPU 272 and the main motor control CPU 262, the power source control circuit 274 detects abnormality in the master control CPU 272 and resets the master control CPU 272. The master control CPU 272 takes charge of the control over the whole hybrid vehicle. The multiple configuration of the monitoring circuit significantly enhances the reliability of the control system.

The input port of the abnormality record registration circuit 280 receives the reset signals RES1 and RES2 transmitted between the master control CPU 272 and the main motor control CPU 262. The abnormality record registration circuit 280 registers the input reset signals RES1 and RES2 into the internal EEPROM 282. Namely the abnormality record registration circuit 280 has the function of monitoring the generation of the reset signal and registering the generation record in response to the reset of the master control CPU 272 or the main motor control CPU 262.

I. Verification for Validity of Processing in CPUs by Software

The above description regards the verification of the validity of the processing executed in each CPU by taking advantage of the functions of the internal watchdog timer. Each CPU may have a mechanism for verifying the validity of the own processing, other than the watchdog timer. This mechanism is described in detail with regard to the main motor control CPU 262.

Figure 10:
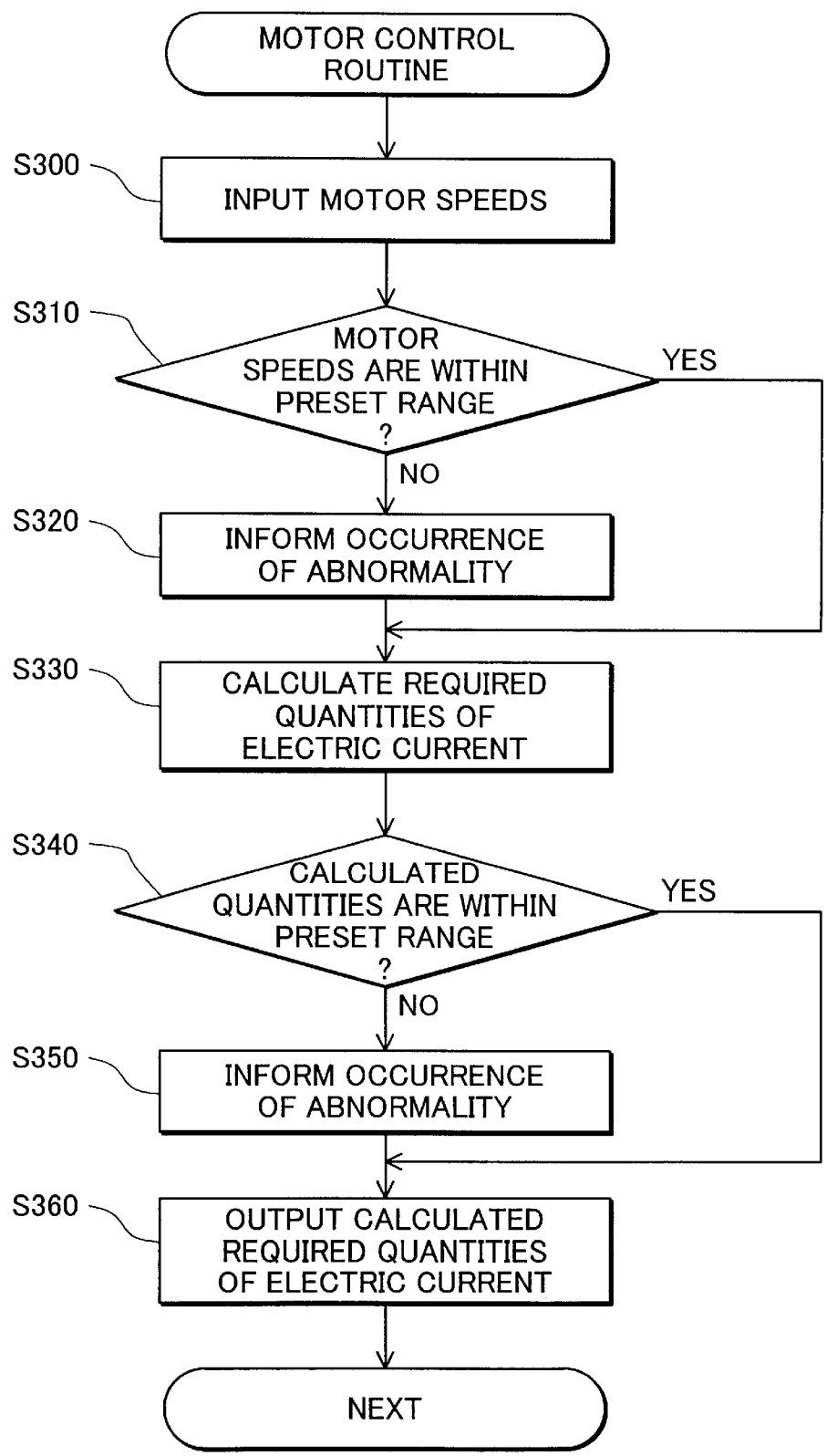
FIG. 10 is a flowchart showing a motor control routine including error detection executed in a third embodiment of the present invention.

FIG. 10 is a flowchart showing a routine of verifying the validity of the own processing. The routine is continually executed by the main motor control CPU 262, while the main motor control CPU 262 controls the first and the second motors MG1 and MG2. When the program enters this routine, the main motor control CPU 262 first inputs revolving speeds REV1 and REV2 of the motors MG1 and MG2 at step S300 and determines whether or not these input revolving speeds REV1 and REV2 are within a predetermined range (0 to RVmax) at step S310. The rotations of the motors MG1 and MG2 are respectively regulated by the first motor control CPU 264 and the second motor control CPU 266. There is a maximum revolving speed RVmax specified for the control. In the case where at least one of the input revolving speeds REV1 and REV2 exceeds the predetermined range at step S310, the main motor control CPU 262 determines that abnormality arises in at least one of the operations executed by the main motor control CPU 262, the first motor control CPU 264, and the second motor control CPU 266, and informs the abnormality record registration circuit 280 of the occurrence of abnormality via the bidirectional communication line 214 at step S320.

In the case where both the input revolving speeds REV1 and REV2 are within the predetermined range at step S310, on the other hand, the main motor control CPU 262 calculates required electric currents I1req and I2req, which are to be output to the first and the second motor control CPUs 264 and 266, at step S330. It is then determined at step S340 whether or not the calculated values of required electric currents I1req and I2req are within a predetermined range (0 to Irqmax). The operation of calculating the required electric currents I1req and I2req is designed to make the calculation results within the predetermined range. Unless the arithmetic operation is abnormal, the calculated values are within this range. In the case where any of the calculation results exceeds the predetermined range, it means that some abnormality arises in the arithmetic operation. The main motor control CPU 262 accordingly informs the abnormality record registration circuit 280 of the occurrence of abnormality via the bidirectional communication line 214 at step S350.

In the case where all the calculation results are within the predetermined range, on the other hand, the main motor control CPU 262 outputs the calculated values of required electric currents I1req and I2req to the first and the second motor control CPUs 264 and 266 at step S360 and exits from this routine. This series of the processing enables the main motor control CPU 262 to verify the validity of the own processing, based on the comparison of the input and output values with the respective predetermined ranges.

J. Verification for Validity of Processing in Opposite CPUs

Figure 11:
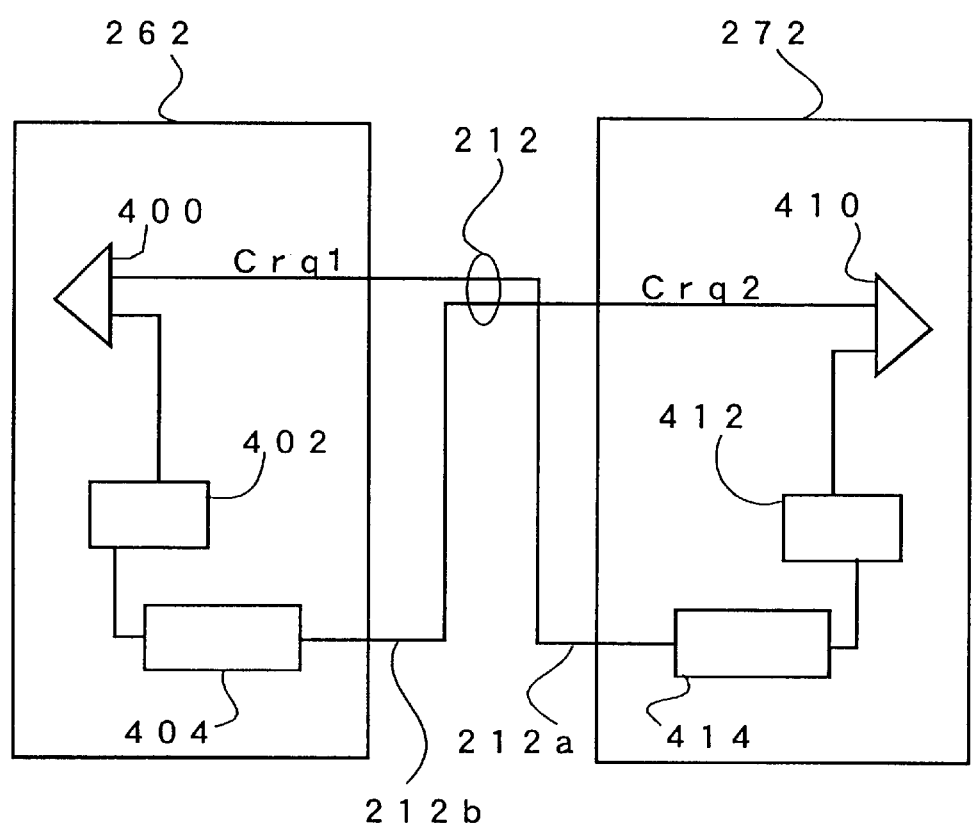
FIG. 11 shows a mechanism in which one of a main motor control CPU and a master control CPU of the main ECU verifies the validity of the processing executed in the other CPU.

The above description regards the hardware configuration that monitors abnormality using the watchdog timer and the software that verifies the validity of the processing in each CPU. The control system of the embodiment may have another mechanism of verifying the validity of the processing as discussed below, in addition to such arrangements of directly monitoring the occurrence of abnormality. The following describes a concrete procedure of verification for the master control CPU 272 and the main motor control CPU 262 that enable data transmission via the bidirectional communication line 212. FIG. 11 schematically shows connection of these two CPUs 262 and 272 via the bidirectional communication line 212. The main motor control CPU 262 and the master control CPU 272 are connected to each other via the bidirectional communication line 212 and actually transmit data therebetween according to a predetermined protocol of serial communication. For the simplicity of explanation, however, in the illustration of FIG. 11, the main motor control CPU 262 receives a requirement of verification (Crq1) transmitted from the master control CPU 272 via a bidirectional communication line 212a, whereas the master control CPU 272 receives a requirement of verification (Crq2) transmitted from the main motor control CPU 262 via a bidirectional communication line 212b.

The mechanism of mutually monitoring abnormality in the main motor control CPU 262 and the master control CPU 272 is described below. The main motor control CPU 262 and the master control CPU 272 respectively include constant storage ROMs 402 and 412. A hexadecimal number 'C.E' is stored in the constant storage ROM 402 of the main motor control CPU 262, whereas another hexadecimal number '31' is stored in the constant storage ROM 412 of the master control CPU 272. The main motor control CPU 262 and the master control CPU 272 respectively have arithmetic logic operation blocks 404 and 414. The outputs of the constant storage ROMs 402 and 412 are respectively connected to the arithmetic logic operation blocks 404 and 414. The operation blocks 404 and 414 respectively receive the constants stored in the constant storage ROMs 402 and 412 and carry out predetermined different operations. The operation block 404 of the main motor control CPU 262 carries out an arithmetic logic operation f1 expressed by Equation (4) given below, and the operation block 414 of the master control CPU 272 carries out another arithmetic logic operation f2 expressed by Equation (5) given below:

$$f1(x)=com[\{9 \times HI(x)+7 \times LOW(x)\} \cap FF_H] \cup 00_H \quad (4)$$

$$f2(x)=com[\{13 \times HI(x)+10 \times LOW(x)\} \cap FF_H] \cup 00_H \quad (5)$$

where the suffix H shows that the number is a hexadecimal number; com(y), HI(x), and LOW(x) respectively denote an operation of taking a complement of a numerical value y, an operation of taking the upper four bits of a numerical value x, and an operation of taking the lower four bits of the numerical value x; and ∩ and ∪ respectively denote an operator of calculating a logical product and an operator of calculating a logical sum.

Substitution of $x=CE_H$ into Equation (4) gives a result $31_H$. This result of the operation is output to the master control CPU 272 as a verification requirement signal Crq2. The verification requirement signal Crq2 is input into a comparison unit 410 incorporated in the master control CPU 272. The comparison unit 410 compares the output of the constant storage ROM 412 with the verification requirement signal Crq2. The value $31_H$ is stored in the constant storage ROM 412 of the master control CPU 272. If the arithmetic logic operation block 404 of the main motor control CPU 262 carries out the operation correctly, the output of the constant storage ROM 412 is coincident with the verification requirement signal Crq2. The master control CPU 272 thus determines whether or not the arithmetic logic operation block 404 of the main motor control CPU 262 works properly by simply reading the output of the comparison unit 410.

The validity of the operation carried out by the arithmetic logic operation block 414 of the master control CPU 272 is, on the other hand, verified by a comparison between a verification requirement signal Crq1 output from the arithmetic logic operation block 414 and a constant stored in the constant storage ROM 402 of the main motor control CPU 262, which is carried out by a comparison unit 400. In this case, the operation executed by the arithmetic logic operation block 414 follows Equation (5), whereas the constant output from the constant storage ROM 402 is $31_H$. The comparison unit 400 accordingly compares the result of the operation carried out by the arithmetic logic operation block 414 (the value CEH when the operation is correct) with the constant CEH stored in the constant storage ROM 402.

For simplicity of explanation, the above description assumes that the operations of Equations (4) and (5) are performed in the respective arithmetic logic operation block 404 and 414. In the actual procedure, however, the CPUs included in the main motor control CPU 262 and the master control CPU 272 successively carry out the arithmetic operations included in Equations (4) and (5) one by one according to a program. The calculation of Equations (4) and (5) implements most of the operations carried out by the arithmetic logic operation circuits, for example, the right shift (the operation HI(x) taking the upper four bits corresponds to the right shift operation repeated four times), the left shift, the addition, the multiplication, the AND operation, the OR operation, and the complement operation. If even one of such operations gives a wrong answer, the comparison results in inconsistency. This arrangement enables the comparison units 400 and 410 to detect abnormality arising in the arithmetic logic operation circuits as well as abnormality arising in the bidirectional communication line 212.

In response to detection of abnormality, the main motor control CPU 262 and the master control CPU 272 respectively write the details of the abnormality into the abnormality record registration circuit 280 via the bidirectional communication lines 214 and 216.

In the embodiment discussed above, each of the CPUs 262 and 272 of the motor controller 260 and the master controller 270 separates the process of verifying the validity of its own processing from the process of entrusting the opposite CPU to verification of the validity of the processing. This arrangement thus enables the validity of the processing to be totally verified with high reliability. The latter process does not verify the resulting value of the processing or control but verifies the validity of the arithmetic logic operation circuit itself, which executes the processing. This verifies not only the validity of the processing under specific conditions but the general validity of the total processing. In the arrangement of the embodiment, the CPU checks the range of the input and output values, based on the results of the verification. Namely the CPU carries out the verification after its own validity is checked. In the arrangement of sharing the parts of verification in the above manner, the other CPU verifies the functions of the arithmetic logic operation circuit itself and is thus not required to verify al the data input into the CPU of interest, which is the object to be verified. This arrangement thus favorably simplifies the data input-output configuration.

K. Other Processes of Verification

The embodiment discussed above causes the other controller or its CPU to verify the validity of the operations executed by the arithmetic logic operation circuit. In other examples, the other controller may verify the validity of the reset pulse state of the watchdog timer or the duty of the watchdog pulse. The verification of the reset pulse state checks whether or not the controller is reset properly by the watchdog timer in the case where the watchdog pulse WDP is not output from the controller using the watchdog timer. The verification of the duty of the watchdog pulse checks whether or not the watchdog pulse is output from the controller at proper intervals.

Figure 12:
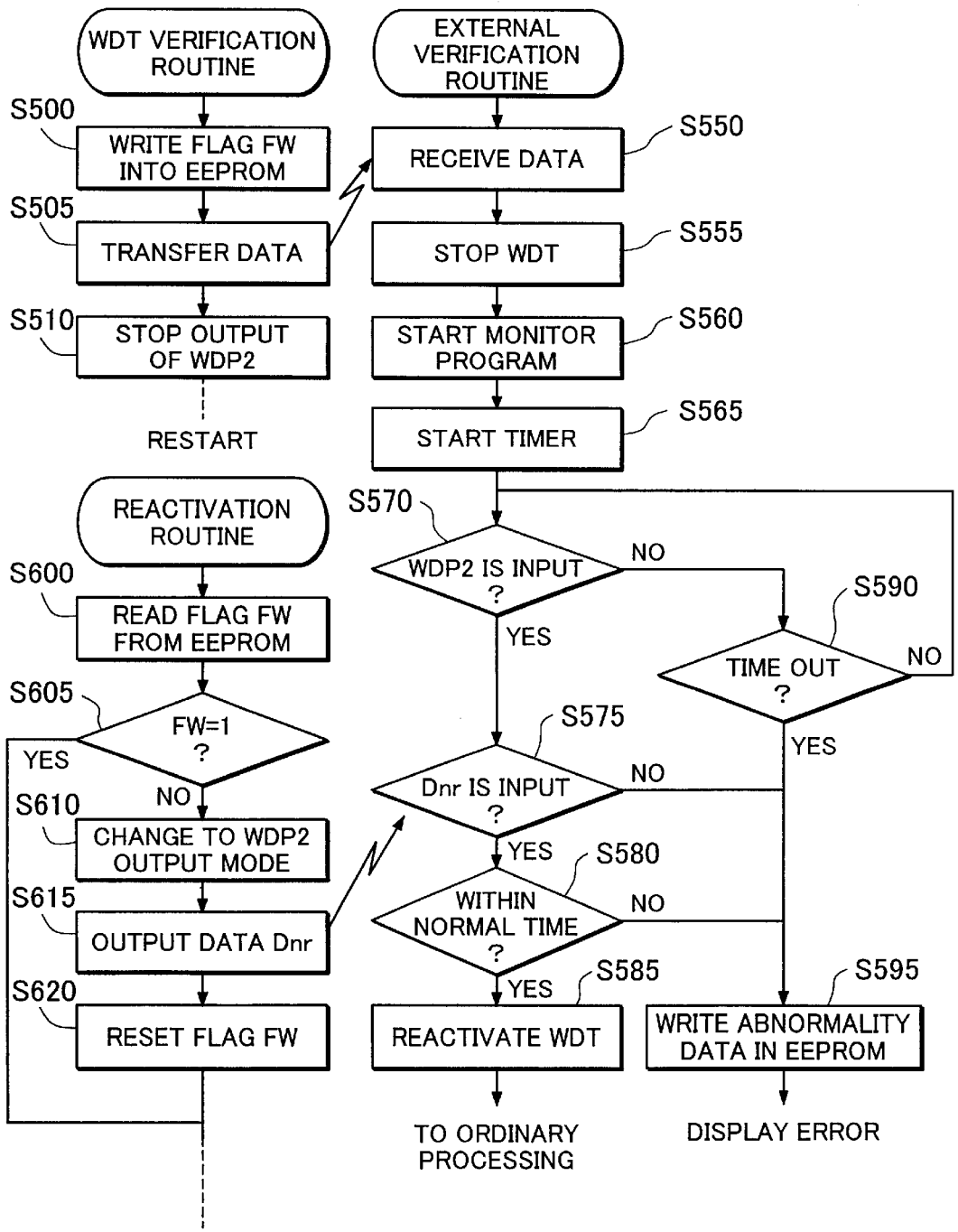
FIG. 12 is a flowchart showing a watchdog timer verification routine in still another embodiment of the present invention.

The verification of the watchdog timer follows a procedure shown in the flowchart of FIG. 12. In this procedure, the other controller or its CPU (in this embodiment, the main motor control CPU 262) verifies the validity of the watchdog timer used by one controller or its CPU (in this embodiment, the master control CPU 272). The procedure first writes a value '1', which represents execution of a reset control test using the watchdog timer incorporated in the power source control circuit 274 into the EEPROM 282 of the abnormality record registration circuit 280 via the bidirectional communication line 216 at step S500. The data of the value '1' is stored as a flag FW in the EEPROM 282. The same data is also transmitted to the main motor control CPU 262 via the bidirectional communication line 212 at step S505. The master control CPU 272 subsequently stops the output of the watchdog pulse WDP2 at step S510.

The main motor control CPU 262 receives the data transmitted from the master control CPU 272 at step S550 and stops the operation of the watchdog timer at step S555, so as not to output the reset signal RES2 while the master control CPU 272 stops the output of the watchdog pulse WDP2. The main motor control CPU 262 then carries out a monitor program at step S560 as discussed below.

The monitor program starts a timer at step S565 and waits for the transmission of the watchdog pulse WDP2 from the master control CPU 272 at step S570. When the reset pulse RES0 is output from the power source control circuit 274 in response to the stop of the watchdog pulse WDP2, the master control CPU 272 is reset and restarts the processing from its initial state. The restarted master control CPU 272 first reads the data from the EEPROM 282 in the abnormality record registration circuit 280 at step S600 and determines whether or not the master control CPU 272 is in the course of self reactivation with the watchdog timer by referring to the value of the flag FW at step S605. In the case of the flag FW=1, that is, when it is determined that the master control CPU 272 is in the course of self reactivation, the master control CPU 272 sets a specific mode to immediately output the watchdog pulse WDP2 at predetermined intervals at step S610. The master control CPU 272 then outputs data Dnr representing normal reactivation to the main motor control CPU 262 via the bidirectional communication line 212 at step S615, resets the flag FW stored in the EEPROM 282 of the abnormality record registration circuit 280 to zero at step S620, and returns to the ordinary processing routine.

When receiving the first watchdog pulse WDP2 transmitted from the master control CPU 272 after its reactivation at step S570, the main motor control CPU 262 waits for input of subsequent data transmitted from the master control CPU 272 via the bidirectional communication line 212 at step S575. In response to the input of the data Dnr that represents the normal reactivation and is transmitted from the master control CPU 272, the main motor control CPU 262 reads the value on the timer to specify the elapse of time at step S580. When the elapse of time is within a predetermined time period or a normal range, the main motor control CPU 262 reactivates the watchdog timer at step S585 and returns to the ordinary processing routine. When the data Dnr has not been sent within the predetermined time period or when the transmitted data is not the correct data Dnr, it is determined that there is some abnormality arising in the reset circuit using the watchdog timer. The main motor control CPU 262 then writes the presence of abnormality in the EEPROM 282 of the abnormality record registration circuit 280 at step S595, and terminates the monitor program. When the watchdog pulse WDP2 has not been transmitted within a preset time period since the start of the timer (step S565), it is regarded as time out at step S590. In this case, the main motor control CPU 262 also determines that there is some abnormality and executes the process of step S595.

The series of the processing discussed above enables the main motor control CPU 262 included in the other controller to verify the reactivation of the master control CPU 272 included in one controller using the watchdog timer, which detects abnormality of the operation of the master control CPU 272. When being reactivated, the master control CPU 272 reads the value of the flag stored in the EEPROM 282 of the abnormality record registration circuit 280 and is thus informed of the performance of reactivation. But the master control CPU 272 can not verify the validity of the reactivation process (for example, the elapse of time before reactivation). This arrangement of enabling the other CPU (the main motor control CPU 262 in the embodiment) to verify the validity of reactivation of the master control CPU 272 is thus extremely useful.

With regard to verification for the duty of the watchdog pulse, the main motor control CPU 262 detects the period of the watchdog pulse WDP2 output from the master control CPU 272 and checks whether or not the period is within an appropriate range. In a similar manner, the master control CPU 272 verifies the duty of the watchdog pulse output from the main motor control CPU 262.

Each controller or its CPU may carry out verification of the following items, other than the ranges of the input data and the operation results shown in FIG. 10:

(1) to check whether or not the state of a variation in input signal is normal (for example, to check whether or not the rate of change of the step-on amount of the accelerator pedal is within a predetermined range);

(2) to check whether or not the behaviors of plural input signals are consistent (for example, when the quantity of air intake decreases irrespective of an increase in step-on amount of the accelerator pedal, it is determined that some abnormality arises. This detects the behaviors of the plural signals that are inconsistent with the expected physical behaviors.

(3) to check the contents of the memory (for example, the contents of the memory are checked with an error detection code, for example, a parity or a checksum); and (4) to check abnormality in serial communication (for example, to check normality of communication of preset data, which is output to the other CPU via the bidirectional communication line 212).

There are a variety of combinations with regard to the two different types of verification for the validity of the processing, that is, verification of the validity of the processing performed by the CPU or controller of interest that actually executes the processing and verification of the validity of the processing performed by another CPU or controller. In accordance with desirable applications, the former type carries out the verification with the actual data and numerical values, whereas the latter type carries out the verification of the validity of the processing algorithm or the processing circuit with general-purpose data. This is because the CPU of interest that actually executes the processing knows the range of the data required for the processing. The other CPU, on the other hand, does not verify the data themselves required for the processing. This arrangement effectively prevents an unnecessary increase in number of input data.

In the structure of the above embodiment, the main motor control CPU 262 and the master control CPU 272 cooperatively verify the validity of the processing. In one possible modification, the main motor control CPU 262 and the first and the second motor control CPUs 264 and 266 may cooperatively carry out the verification. The verification may also be carried out by the cooperation of the master control CPU 272 and the power source control circuit 274, by the cooperation of the master control CPU 272 and the engine ECU 240, or by the cooperation of the master control CPU 272 and the battery ECU 230.

The above embodiments are to be considered in all aspects as illustrative and not restrictive. There may be many modifications, changes, and alterations without departing from the scope or spirit of the main characteristics of the present invention. For example, the technique of the present invention is applicable to monitor abnormality or detect an error in any system or equipment other than the vehicle. All changes within the meaning and range of equivalency of the claims are therefore intended to be embraced therein.

The scope and spirit of the present invention are indicated by the appended claims, rather than by the foregoing description.

What is claimed is:

1. A control system that carries out arithmetic and logic operations to control an object, said control system comprising:

a plurality of controllers that are connected with one another and include a first controller and a second controller to control operation of said object, said first controller comprising a first reset execution unit that carries out a first reset event, which resets a circuit configuration of a predetermined range including said second controller in response to input of a reset signal, said second controller comprising a second reset execution unit that does not output the reset signal to said first controller in response to the reset of said second controller by the first reset event, and outputs the reset signal to said first controller in response to detection of abnormality arising in said first controller.

2. A control system in accordance with claim 1, wherein said first controller takes charge of upper-most level control in the circuit configuration of the predetermined range in the process of controlling said object.

3. A control system in accordance with claim 1, wherein said first controller and said second controller mutually monitor abnormality in the opposite controllers and respectively transmit the reset signal to the opposite controller in response to detection of abnormality arising in the opposite controller.

4. A control system in accordance with claim 2, wherein said first controller and said second controller mutually monitor abnormality in the opposite controllers and respectively transmit the reset signal to the opposite controller in response to detection of abnormality arising in the opposite controller.

5. A control system in accordance with claim 1, said control system being mounted on a moving object with a prime mover, said control system comprising a monitoring circuit that monitors abnormality in said first controller and transmits a reset signal to said first controller in response to detection of abnormality arising in said first controller, said control system carrying out a reset test at a time of starting said moving object, the reset test checking whether or not a reset operation of said first controller by means of said second controller and a reset operation of said first controller by said monitoring circuit are performed normally.

6. A control system in accordance with claim 1, said control system further comprising a reset record registration unit that is connected to one of said plurality of controllers and stores results of said reset test registered therein.

7. A control system in accordance with claim 6, wherein said reset record registration unit detects and stores generation of at least part of a plurality of reset signals transmitted to said plurality of controllers in the course of the reset test.

8. A control system in accordance with claim 7, said control system being mounted on a moving object with a prime mover, wherein said reset record registration unit detects and stores generation of at least part of the plurality of reset signals during a drive of said moving object after the reset test.

9. A method of controlling an object with a plurality of controllers that are connected with one another and include a first controller and a second controller, said method comprising the steps of:

(a) carrying out a first reset event, which resets a circuit configuration of a predetermined range including said second controller in response to input of a reset signal into said first controller; and (b) outputting the reset signal to said first controller when said second controller detects abnormality arising in said first controller, wherein said second controller does not output the reset signal to said first controller in response to the reset of said second controller in said step (a).

10. A moving object with a prime mover, said moving object comprising a control system, which has a plurality of controllers that are connected with one another and include a first controller and a second controller to control operation of said moving object, said first controller comprising a first reset execution unit that carries out a first reset event, which resets a circuit configuration of a predetermined range including said second controller in response to input of a reset signal, said second controller comprising a second reset execution unit that does not output the reset signal to said first controller in response to the reset of said second controller by the first reset event, and outputs the reset signal to said first controller in response to detection of abnormality arising in said first controller.

11. A method of detecting a processing error arising in any of at least two controllers included in a control system, each of said at least two controllers comprising an arithmetic logic operation unit that follows a specific program and carrying out predetermined processing according to the specific program, said method comprising the steps of:

separating a first process from a second process, the first process causing a controller of interest, which executes the predetermined processing, to verify the validity of the predetermined processing based on a result of the predetermined processing, the second process causing another controller, which is different from said controller of interest, to verify the validity of the predetermined processing carried out by said controller of interest;

carrying out the first process in which said controller of interest verifies the validity of the predetermined processing; and carrying out the second process in which said another controller receives the result of the predetermined processing carried out by said controller of interest and verifies the validity of the predetermined processing.

12. A method in accordance with claim 11, wherein the second process verifies the validity of an operation executed by said arithmetic logic operation unit included in said controller of interest, and in the second process, said another controller causes said arithmetic logic operation unit included in said another controller to perform an operation and thereby verify the validity of the operation executed in said controller of interest.

13. A method in accordance with claim 11, wherein the first process specifies a range of a result obtained by the first process and thereby verifies the validity of the predetermined processing.

14. A method in accordance with claim 11, wherein the second process causes said another controller to check results of arithmetic logic operations including a predetermined fundamental operation with regard to a predetermined value and thereby verifies the validity of the predetermined processing.

15. A method in accordance with claim 11, wherein each of said at least two controllers is mounted on a moving object with a prime mover, and the first process is at least part of a control process that controls an apparatus including said engine of said moving object.

16. A method in accordance with claim 15, wherein said at least two controllers are any of an engine controller that controls said engine, a motor controller that controls a motor, which outputs power required for said moving object in cooperation with said engine, a battery controller that regulates a battery, which supplies electric power to said motor, and a brake controller that regulates a braking force of said moving object.

17. A method in accordance with claim 11, wherein each of said at least two controllers transmits and receives a result of the second process via serial communication.

18. A control system comprising at least two controllers, each of said at least two controllers comprising an arithmetic logic operation unit that follows a specific program and carrying out predetermined processing according to the specific program, each of said at least two controllers comprising:

a first verification unit that stores and carries out a first process, the first process causing a controller of interest, which executes the predetermined processing, to verify the validity of the predetermined processing based on a result of the predetermined processing; and a second verification unit that stores a second process and receives a result of the second process from another controller, which is different from said controller of interest, the second process causing said another controller to verify the validity of the predetermined processing carried out by said controller of interest.

19. A control system in accordance with claim 18, wherein each of said at least two controllers is included in an apparatus that controls a drive of a moving object, and said first verification unit and said second verification unit verify the validity of the predetermined processing carried out by said each controller.

20. A control system in accordance with claim 18, wherein said second verification unit verifies the validity of an operation of an arithmetic logic operation unit included in said controller of interest, and said second verification unit comprises:

an operation result input unit that receives a result of the operation performed by said controller of interest; and a verification unit that causes an arithmetic logic operation unit included in said another controller to perform the operation and thereby verify the validity of the input result of the operation.

21. A control system in accordance with claim 18, wherein said first verification unit specifies a range of a result obtained by the first process and thereby verifies the validity of the predetermined processing.

22. A control system in accordance with claim 18, wherein said second verification unit receives results of arithmetic logic operations including a predetermined fundamental operation with regard to a predetermined value and verifies the validity of the predetermined processing based on the input results.

23. A control system in accordance with claim 18, wherein each of said at least two controllers is mounted on a moving object with a prime mover, and said first verification unit carries out the verification for at least part of a control process that controls an apparatus including said engine of said moving object.

24. A control system in accordance with claim 23, wherein said at least two controllers are any of an engine controller that controls said engine, a motor controller that controls a motor, which outputs power required for said moving object in cooperation with said engine, a battery controller that regulates a battery, which supplies electric power to said motor, and a brake controller that regulates a braking force of said moving object.

25. A control system in accordance with claim 18, wherein each of said at least two controllers comprises a communication unit that transmits and receives data by serial communication, and said each controller receives a result of the second process verified by said second verification unit and transmitted via said communication unit.

26. A control system in accordance with claim 18, wherein each of said at least two controllers is a one-chip microcomputer including a CPU.

* * * * *